US012560878B2

(12) United States Patent
Ohira

(10) Patent No.: US 12,560,878 B2
(45) Date of Patent: Feb. 24, 2026

(54) IMAGE FORMING APPARATUS

(71) Applicant: BROTHER KOGYO KABUSHIKI KAISHA, Nagoya (JP)

(72) Inventor: Ayaka Ohira, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/963,036

(22) Filed: Nov. 27, 2024

(65) Prior Publication Data

US 2025/0181015 A1 Jun. 5, 2025

(30) Foreign Application Priority Data

Nov. 30, 2023 (JP) ................................ 2023-203310

(51) Int. Cl.

*G03G 15/20* (2006.01)
*G03G 15/00* (2006.01)
*G03G 21/16* (2006.01)

(52) U.S. Cl.

CPC ..... *G03G 15/2017* (2013.01); *G03G 15/2064* (2013.01); *G03G 15/50* (2013.01); *G03G 15/657* (2013.01); *G03G 21/1647* (2013.01)

(58) Field of Classification Search

CPC ........... G03G 15/2017; G03G 15/2064; G03G 15/50; G03G 15/657; G03G 21/1647

See application file for complete search history.

(56) References Cited

U.S. PATENT DOCUMENTS

| | | | | |
|---|---|---|---|---|
| 2002/0186986 A1* | 12/2002 | Makihira | ........... | G03G 15/2017 399/92 |
| 2004/0052548 A1* | 3/2004 | Shimizu | ............. | G03G 15/2028 399/122 |
| 2019/0163121 A1 | 5/2019 | Wada et al. | | |
| 2023/0082752 A1* | 3/2023 | Toyota | ............... | G03G 21/1647 399/328 |
| 2024/0111243 A1* | 4/2024 | Uehara | .............. | G03G 15/2017 |

FOREIGN PATENT DOCUMENTS

| | | |
|---|---|---|
| JP | 2019-101165 A | 6/2019 |

* cited by examiner

*Primary Examiner* — Sandra Brase
(74) *Attorney, Agent, or Firm* — Merchant & Gould P.C.

(57) ABSTRACT

An image forming apparatus includes: a fixing chute located upstream of a fixing device in a sheet conveying direction; a fixing guide opposing the fixing chute and including a guide conveying surface; and a fixing shutter opposing the fixing chute and configured to move between a closed position and an opened position. In a state in which the fixing shutter is positioned at the opened position, a shutter conveying surface of the fixing shutter is inclined in a direction approaching the fixing chute toward a downstream side in a sheet conveying direction such that an end portion of the shutter conveying surface on the downstream side is located closer to the fixing chute than an end portion of the guide conveying surface on an upstream side in the sheet conveying direction.

17 Claims, 26 Drawing Sheets

IMAGE FORMING APPARATUS

REFERENCE TO RELATED APPLICATIONS

This application claims priority from Japanese Patent Application No. 2023-203310 filed on Nov. 30, 2023. The entire content of the priority application is incorporated herein by reference.

BACKGROUND ART

The present disclosure relates to an image forming apparatus.

There is an image forming apparatus including a fixing shutter for the purpose of preventing a finger of a user from touching a heating member of a fixing device. The fixing shutter is provided in front of the heating member and movable between a closed position where a part of the heating member is covered and an open position where the part of the heating member is exposed.

The fixing shutter is normally located at a position retracted from a sheet conveying path when the fixing shutter is positioned at the opened position.

DESCRIPTION

In the image forming apparatus provided with the fixing shutter, when a sheet is curled or when behavior of a sheet is unstable, the sheet may not be conveyed properly due to, for example, the sheet hitting the fixing shutter, which results in a jam.

The present disclosure provides an image forming apparatus capable of conveying a sheet stably even in the image forming apparatus including a fixing shutter.

The present disclosure provides an image forming apparatus according to the following aspects.

An image forming apparatus includes: an apparatus body; a fixing device including a heating unit, the fixing device being configured to fix a toner image onto a sheet that is conveyed on a sheet conveying path in a sheet conveying direction; a fixing chute located upstream of the fixing device in the sheet conveying direction, the fixing chute being configured to form a part of the sheet conveying path; a fixing guide located upstream of the heating unit in the sheet conveying direction to oppose the fixing chute across the sheet conveying path in a sheet thickness direction, the fixing guide being configured to guide the sheet and including a guide conveying surface inclined in a direction approaching the fixing chute toward a downstream side in the sheet conveying direction; and a fixing shutter located to oppose the fixing chute across the sheet conveying path in the sheet thickness direction and configured to move between a closed position and an opened position, the closed position at which the fixing shutter covers a part of the heating unit on an upstream side relative to the fixing device in the sheet conveying direction, the opened position at which the fixing shutter opens the part of the heating unit relative to the fixing device on the upstream side in the sheet conveying direction. The fixing shutter includes a shutter conveying surface. In a state in which the fixing shutter is positioned at the opened position, the shutter conveying surface is configured to guide the sheet on the upstream side of the fixing guide in the sheet conveying direction, and the shutter conveying surface is inclined in a direction approaching the fixing chute toward the downstream side in the sheet conveying direction such that an end portion of the shutter conveying surface on the downstream side in the sheet conveying direction is located closer to the fixing chute than an end portion of the guide conveying surface on the upstream side in the sheet conveying direction.

With this configuration, a step in which the end portion of the shutter conveying surface on the downstream side in the sheet conveying direction is located closer to the fixing chute than the end portion of the guide conveying surface on the upstream side in the sheet conveying direction is formed between the shutter conveying surface and the guide conveying surface. Therefore, when the sheet guided to the shutter conveying surface is transferred from the shutter conveying surface to the guide conveying surface, the leading end of the sheet that is conveyed can be prevented from getting caught in the fixing guide, and the sheet can be conveyed stably even in a case in which the fixing shutter is provided.

In the state in which the fixing shutter is positioned at the opened position, the end portion of the shutter conveying surface on the downstream side in the sheet conveying direction overlaps with the guide conveying surface in the sheet conveying direction.

With this configuration, the sheet guided to the shutter conveying surface can be smoothly transferred to the guide conveying surface, whereby it is possible to prevent the sheet from getting caught in the fixing guide.

An inclination angle of the shutter conveying surface with respect to the sheet conveying direction is larger than an inclination angle of the guide conveying surface with respect to the sheet conveying direction.

With this configuration, a larger space can be secured between the shutter conveying surface and the fixing chute, whereby it is possible to prevent the sheet that is conveyed from jamming.

In a state in which the fixing shutter is positioned at the closed position, the shutter conveying surface of the fixing shutter faces the fixing device.

With this configuration, when the fixing shutter is positioned at the closed position, the shutter conveying surface is oriented on the fixing device side on which it is difficult for a user's hand to touch the shutter conveying surface. Consequently, it is possible to avoid a situation in which a user's hand touches the shutter conveying surface and dirt adheres to the shutter conveying surface, and then, the sheet that is conveyed comes into contact with the shutter conveying surface, and the sheet becomes dirty.

The fixing shutter includes a shielding surface, and in a state in which the fixing shutter is positioned at the closed position, the shielding surface covers the part of the heating unit on the upstream side relative to the fixing device in the sheet conveying direction, and the shielding surface extends in a direction intersecting a direction in which the shutter conveying surface extends.

With this configuration, the heating unit is covered by the shielding surface when the fixing shutter is positioned at the closed position, whereby a user can be restrained from touching the heating unit.

The image forming apparatus includes: a cartridge configured to be attached to and detached from the apparatus body; and a shutter link provided in the apparatus body and connected to the fixing shutter, and the shutter link is configured to move the fixing shutter between the opened position and the closed position in conjunction with an operation of attaching and detaching the cartridge with respect to the apparatus body.

With this configuration, the fixing shutter can be opened and closed by the operation of attaching and detaching the cartridge with respect to the apparatus body without performing a separate operation for opening and closing the fixing shutter.

The image forming apparatus includes an upstream guide configured to guide the sheet on the upstream side of the shutter conveying surface of the fixing shutter in the sheet conveying direction, and an end portion of the upstream guide on the downstream side in the sheet conveying direction is located closer to the fixing chute than an end portion of the shutter conveying surface on the upstream side in the sheet conveying direction.

With this configuration, a step in which the end portion of the upstream guide on the downstream side in the sheet conveying direction is located closer to the fixing chute than the end portion of the shutter conveying surface on the upstream side in the sheet conveying direction is formed between the upstream guide and the shutter conveying surface. Consequently, when the sheet guided to the upstream guide is transferred to the shutter conveying surface, the sheet can be prevented from getting caught in the fixing shutter, and the sheet can be conveyed stably.

The image forming apparatus includes: a movable chute that is located downstream of a transfer unit configured to transfer an image onto the sheet and upstream of the fixing device in the sheet conveying direction, the movable chute being configured to move between a first position and a second position, and an end portion of the movable chute on the downstream side in the sheet conveying direction in a state in which the movable chute is positioned at the second position is farther from the sheet conveying path than an end portion of the movable chute on the downstream side in the sheet conveying direction in a state in which the movable chute is positioned at the first position.

With this configuration, the sheet conveyed from the transfer unit can be properly guided to the fixing device by the movable chute.

The movable chute includes a sheet conveying surface configured to guide the sheet, and in a state in which the movable chute is positioned at the first position, a virtual plane passes through the fixing guide, where the virtual plane is obtained by extending the sheet conveying surface at an end portion of the movable chute on the downstream side in the sheet conveying direction.

In a case in which the sheet guided to the sheet conveying surface of the movable chute is a straight paper that is not curled or a curled paper that is curled away from the shutter conveying surface, the leading end of the sheet guided by the movable chute comes into contact with the guide conveying surface located downstream of the shutter conveying surface. As a result, the sheet can be guided to the fixing device more stably.

A perpendicular line to the shutter conveying surface of the fixing shutter passes through the movable chute.

With this configuration, the sheet conveyed from the movable chute can be appropriately guided toward the fixing device by the shutter conveying surface.

The image forming apparatus includes: a drive source configured to move the movable chute; and a controller configured to control an operation of the drive source, and the controller is configured to control the drive source to move the movable chute from the first position toward the second position after a leading end of the sheet passes through the fixing device.

During the period in which the sheet is conveyed by both the fixing device and the transfer unit after the leading end of the sheet passes through the fixing device, the conveying speed of the sheet by the transfer unit is larger than the conveying speed of the sheet by the fixing device, and bending occurs in the sheet between the fixing device and the transfer unit. Therefore, by moving the movable chute toward the second position away from the sheet conveying path under the control of the control unit, a larger space can be secured between the fixing device and the transfer unit, whereby it is possible to prevent the bent sheet from interfering with other components of the apparatus body.

The image forming apparatus includes a chute link connected to the drive source and configured to move the movable chute from the first position to the second position. The drive source is a solenoid actuator configured to drive the chute link, the movable chute includes a sheet conveying surface configured to guide the sheet, and the chute link is driven by the drive source to press the movable chute from a sheet conveying surface side to move the movable chute from the first position to the second position.

With this configuration, the movable chute can be quickly and stably moved from the first position to the second position.

The fixing guide includes a guide protrusion located at an end portion of the guide conveying surface in a direction perpendicular to the sheet conveying direction and protruding toward the fixing chute beyond the guide conveying surface. The guide protrusion is inclined in a direction approaching the fixing chute toward the downstream side in the sheet conveying direction, and an inclination angle of the guide protrusion with respect to the sheet conveying direction is larger than an inclination angle of the shutter conveying surface with respect to the sheet conveying direction.

When the trailing end of the sheet that is conveyed passes through the guide conveying surface, the trailing end of the sheet may bounce. However, since the fixing guide includes the guide protrusion, the sheet that is conveyed can be pressed by the guide protrusion to suppress the bouncing that occurs at the trailing end of the sheet. Further, since the inclination angle of the guide protrusion is formed to be larger than the inclination angle of the guide conveying surface, even in a case in which the guide protrusion protrudes beyond the guide conveying surface, the end portion of the guide protrusion on the upstream side in the sheet conveying direction can be positioned farther away from the fixing chute than the end portion of the shutter conveying surface on the downstream side in the sheet conveying direction, As a result, it is possible to prevent the sheet that is conveyed from getting caught in the guide protrusion.

According to the present disclosure, when the sheet is transferred from the shutter conveying surface to the guide conveying surface, the leading end of the sheet that is conveyed can be prevented from getting caught in the fixing guide, and the sheet can be conveyed stably.

Next, an embodiment of the present disclosure will be described with reference to the accompanying drawings.

[Image Forming Apparatus]

Figure 1:
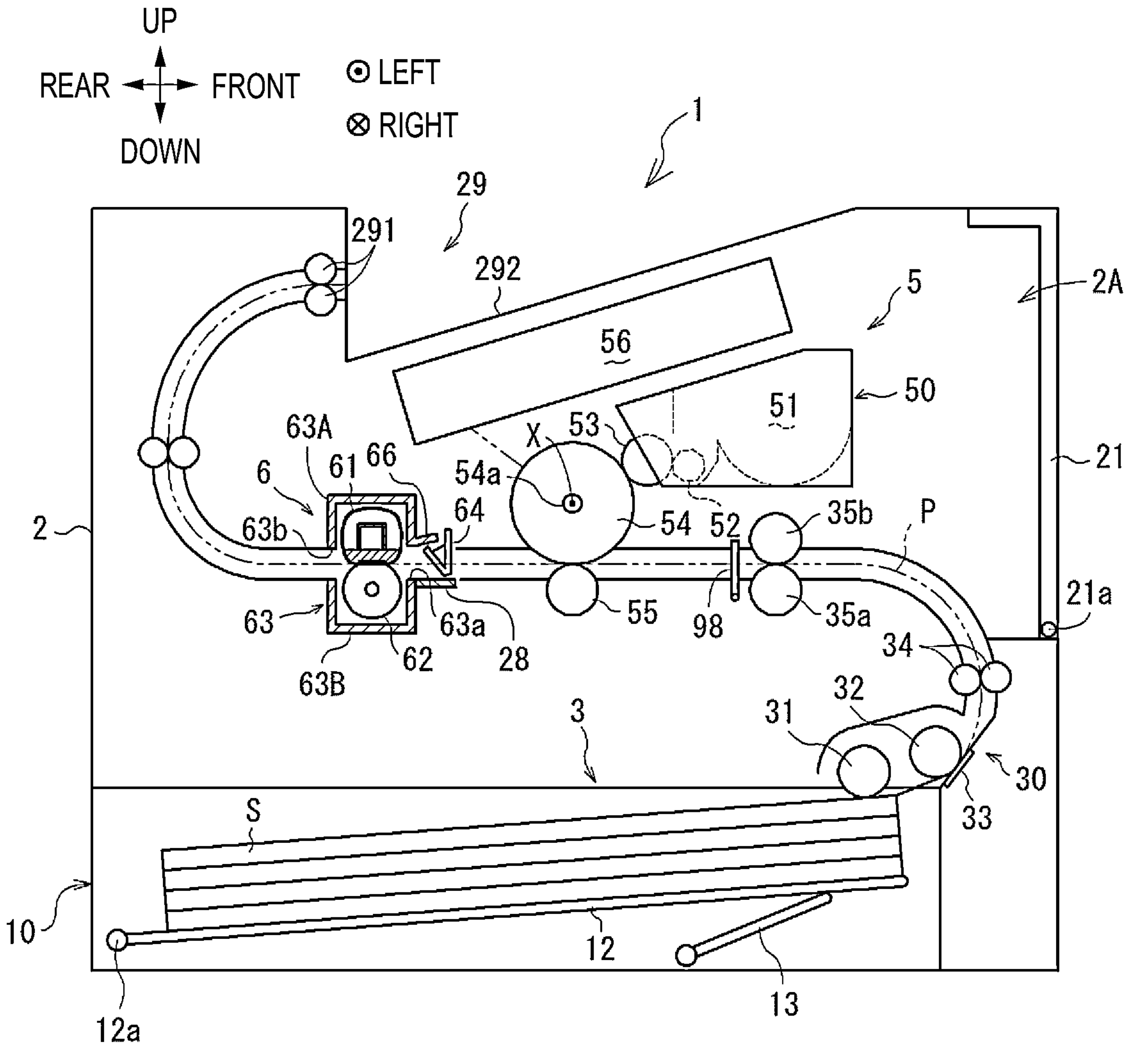
FIG. 1 is a schematic central sectional view showing an image forming apparatus.

An image forming apparatus 1 shown in FIG. 1 is an embodiment of an image forming apparatus equipped with a sheet conveying device according to the present disclosure, and is a laser printer for forming an image on a sheet S by electrophotography.

In the following description, the right side in FIG. 1 is defined as the front side of the image forming apparatus 1, the left side in FIG. 1 is defined as the rear side of the image forming apparatus 1, the near side in FIG. 1 is defined as the left side of the image forming apparatus 1, and the far side in FIG. 1 is defined as the right side of the image forming apparatus 1. Further, the upper and lower sides in FIG. 1 are defined as the upper and lower sides of the image forming apparatus 1, respectively.

The image forming apparatus 1 includes an apparatus body 2, a feeder unit 3, an image forming unit 5, a fixing device 6, and a sheet discharge part 29.

The apparatus body 2 houses the feeder unit 3, the image forming unit 5, the fixing device 6, and the sheet discharge part 29. An opening portion 2A is opened on the front surface of the apparatus body 2, and the apparatus body 2 has a front cover 21 capable of opening and closing the opening portion 2A. The front cover 21 is configured to be rotatable about a rotation axis 21*a* at its lower end portion. The front cover 21 is movable between a closed position where the opening portion 2A is closed and an opened position where the opening portion 2A is opened by rotating about the rotation axis 21*a*.

The feeder unit 3 includes a sheet feeding tray 10 for supporting the sheet S, a sheet conveying part 30, a conveying roller pair 34, and a register roller 35*a*. The feeder unit 3 is disposed at the lower part of the apparatus body 2 and conveys the sheet S supported on the sheet feeding tray 10 to the image forming unit 5. The image forming apparatus 1 has a conveying path P for the sheet S, which runs from the feeder unit 3 to the sheet discharge part 29 via the image forming unit 5. The conveying path P is an example of a sheet conveying path.

The sheet feeding tray 10 has a pressure plate 12 and a pressing plate 13. The pressure plate 12 is a plate-like member that supports the sheet S from below. The pressure plate 12 is rotatable about a rotation fulcrum 12*a* at its rear end portion. The pressure plate 12 can be raised and lowered between a raised position and a lowered position by rotating about the rotation fulcrum 12*a*. The pressing plate 13 is located below the pressure plate 12 and is capable of raising and lowering the pressure plate 12 between the raised position and the lowered position.

The sheet conveying part 30 is a conveying mechanism that separates and takes out the sheets S supported on the sheet feeding tray 10 one by one and conveys the sheet S toward the image forming unit 5. The sheet conveying part 30 includes a sheet feeding roller 31, a separating roller 32, and a separating pad 33.

The sheet feeding roller 31 is a roller for feeding the sheet S supported on the sheet feeding tray 10 toward the separating roller 32. The separating roller 32 is disposed downstream of the sheet feeding roller 31 in a sheet conveying direction, and the separating pad 33 is disposed facing the separating roller 32 and is urged toward the separating roller 32.

The sheet S that is fed toward the separating roller 32 by the sheet feeding roller 31 are separated between the separating roller 32 and the separating pad 33 one by one. The sheet S separated one by one is sent out to the conveying path P.

The sheet S sent out to the conveying path P is conveyed toward the image forming unit 5 by the conveying roller pair 34, the register roller 35*a*, and a pinch roller 35*b* disposed facing the register roller 35*a*. The register roller 35*a* temporarily stops the sheet S by regulating the movement of the leading end of the sheet S that is conveyed, and conveys the sheet S toward the image forming unit 5 at a predetermined timing.

The image forming apparatus 1 includes a post-registration sensor 98 for detecting the sheet S that is conveyed along the conveying path P, downstream of the register roller 35*a* in the sheet conveying direction. The post-registration sensor 98 can be configured in such a manner that it detects the leading end of the sheet S and is turned on in response to the leading end of the sheet S passing through the post-registration sensor 98, and it detects the trailing end of the sheet S and is turned off in response to the trailing end of the sheet S passing through the post-registration sensor 98, for example.

The image forming unit 5 is disposed downstream of the feeder unit 3 in the sheet conveying direction, and forms an image on the sheet S conveyed from the feeder unit 3. The image forming unit 5 includes a process cartridge 50 that transfers the image onto the surface of the sheet S conveyed from the feeder unit 3, a transfer roller 55 disposed facing the photosensitive drum 54 of the process cartridge 50, and an exposure unit 56 that exposes the surface of the photosensitive drum 54. The process cartridge 50 is an example of a cartridge that can be detachably attached to the apparatus body.

The process cartridge 50 is disposed above the feeder unit 3 in the apparatus body 2, and includes a developer storing chamber 51, a supply roller 52, a developing roller 53, and the photosensitive drum 54, and the like. The process cartridge 50 supports the pinch roller 35*b*.

The process cartridge 50 includes a drum cartridge having the photosensitive drum 54, and a developing cartridge attached to the drum cartridge and having the developing roller 53. The process cartridge 50 is detachably attached to the apparatus body 2. In this case, the process cartridge 50 is attached to the apparatus body 2 by integrally inserting the drum cartridge and the developing cartridge attached to the drum cartridge into the apparatus body 2, and is detached from the apparatus body 2 by integrally pulling the drum cartridge and the developing cartridge attached to the drum cartridge out of the apparatus body 2.

The process cartridge 50 is an example of a cartridge, and can include at least one of the photosensitive drum, the developing roller, and a toner container. The process cartridge 50 can be attached to and detached from the apparatus body 2 when the front cover 21 is at the opened position.

In a state in which the process cartridge 50 is attached to the apparatus body 2, the photosensitive drum 54 is disposed in a posture where its axis center X extends along the left and right direction. The photosensitive drum 54 has a metallic drum shaft 54*a* that extends along the direction of the axis center X. The photosensitive drum 54 rotates about the drum shaft 54*a*.

In the present embodiment, the process cartridge 50 includes the drum cartridge having the photosensitive drum 54, and the developing cartridge attached to the drum cartridge and having the developing roller 53. However, the process cartridge may be configured to include a cartridge that has the photosensitive drum 54 and the developing roller 53, and a toner box attached to the cartridge for storing toner.

Further, the image forming apparatus may be configured so that the drum cartridge having the photosensitive drum 54, and the developing cartridge having the developing roller 53 are separately attached to the apparatus body 2. That is, the process cartridge 50 may include at least one of the photosensitive drum, the developing roller, and the toner container, and may be configured to be detachably attached to the apparatus body.

The exposure unit 56 includes a laser diode, a polygon mirror, a lens, and a reflector, and the like. The exposure unit 56 exposes the surface of the photosensitive drum 54 by irradiating the photosensitive drum 54 with laser light based on the image data input to the image forming apparatus 1.

The developer storing chamber 51 stores toner that becomes developer. The toner stored in the developer storing chamber 51 is sent to the supply roller 52 while being stirred by a stirring member (not shown). The supply roller 52 further supplies the toner sent from the developer storing chamber 51 to the developing roller 53.

The developing roller 53 is disposed in close contact with the supply roller 52, and carries the toner supplied from the supply roller 52 and positively charged by a sliding contact member (not shown). Further, a development bias is applied to the developing roller 53 by a bias applying means (not shown).

The photosensitive drum 54 is disposed adjacent to the developing roller 53. The surface of the photosensitive drum 54 is uniformly charged by a charger (not shown), and then is exposed by the exposure unit 56. The exposed portion of the photosensitive drum 54 has a lower potential than the other portions, so that an electrostatic latent image based on the image data is formed on the photosensitive drum 54. Then, by supplying positively charged toner from the developing roller 53 to the surface of the photosensitive drum 54 on which the electrostatic latent image is formed, the electrostatic latent image is visualized as a toner image.

The transfer roller 55 is disposed facing the photosensitive drum 54, and a transfer bias is applied to the transfer roller 55 by a bias applying means (not shown). In a state in which the transfer bias applied to the surface of the transfer roller 55, the sheet S is conveyed while being sandwiched between the photosensitive drum 54, on which the toner image is formed, and the transfer roller 55, whereby the toner image formed on the surface of the photosensitive drum 54 is transferred onto the surface of the sheet S. The photosensitive drum 54 of the process cartridge 50, and the transfer roller 55 constitute a transfer part that transfers an image onto the sheet S. The sheet S onto which the toner image is transferred is conveyed to the fixing device 6.

The fixing device 6 includes a heating unit 61 and a pressurizing roller 62, and fixes the image transferred onto the sheet S by the process cartridge 50. The heating unit 61 is heated by supplying electric power from a power source (not shown). The heating unit 61 is an example of a heating part, and the pressurizing roller 62 is an example of a pressurizing part. The pressurizing roller 62 is disposed facing the heating unit 61. One of the heating unit 61 and the pressurizing roller 62 is urged against the other by an urging mechanism (not shown), and the heating unit 61 and the pressurizing roller 62 are in close contact with each other.

When the sheet S onto which the toner image is transferred is conveyed to the fixing device 6, the sheet S is conveyed while being sandwiched between the heating unit 61 and the pressurizing roller 62, so that the sheet S is heated, and the toner image is fixed to the sheet S. In this manner, the fixing device 6 fixes the toner image transferred onto the sheet S conveyed.

The sheet discharge part 29 is located downstream of the image forming unit 5 in the sheet conveying direction, and discharges the sheet S on which the image is formed by the image forming unit 5 to the outside of the image forming apparatus 1. The sheet discharge part 29 includes a sheet discharge roller pair 291 and a sheet discharge tray 292. The sheet discharge roller pair 291 is configured to be able to discharge the sheet S, which is conveyed from the fixing device 6 along the conveying path P, toward the outside of the apparatus body 2. The sheet discharge tray 292 is formed on the upper surface of the apparatus body 2, and supports the sheet S discharged to the outside of the apparatus body 2 by the sheet discharge roller pair 291.

Figure 2:
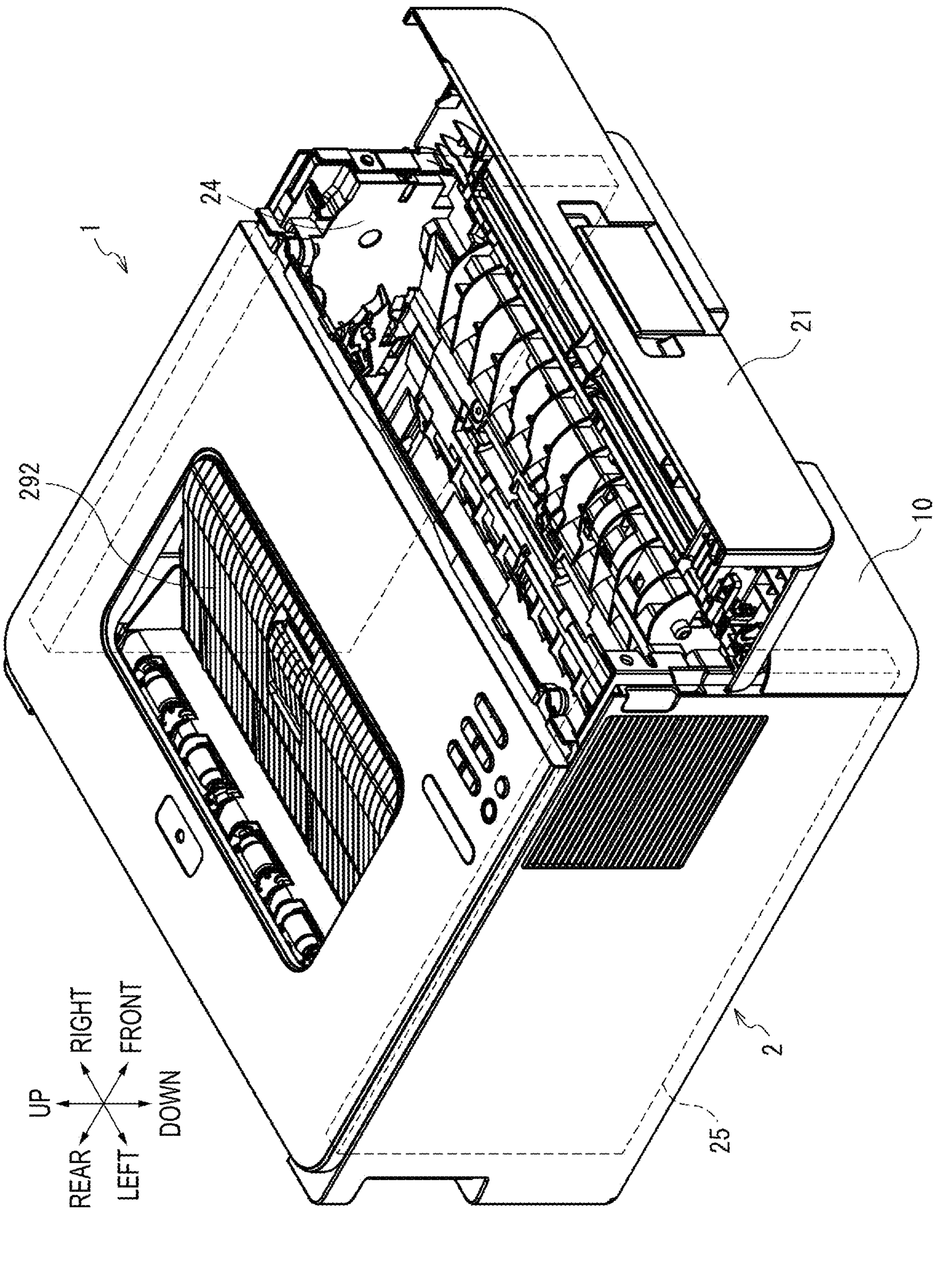
FIG. 2 is a perspective view showing the image forming apparatus with a front cover at an opened position.
Figure 3:
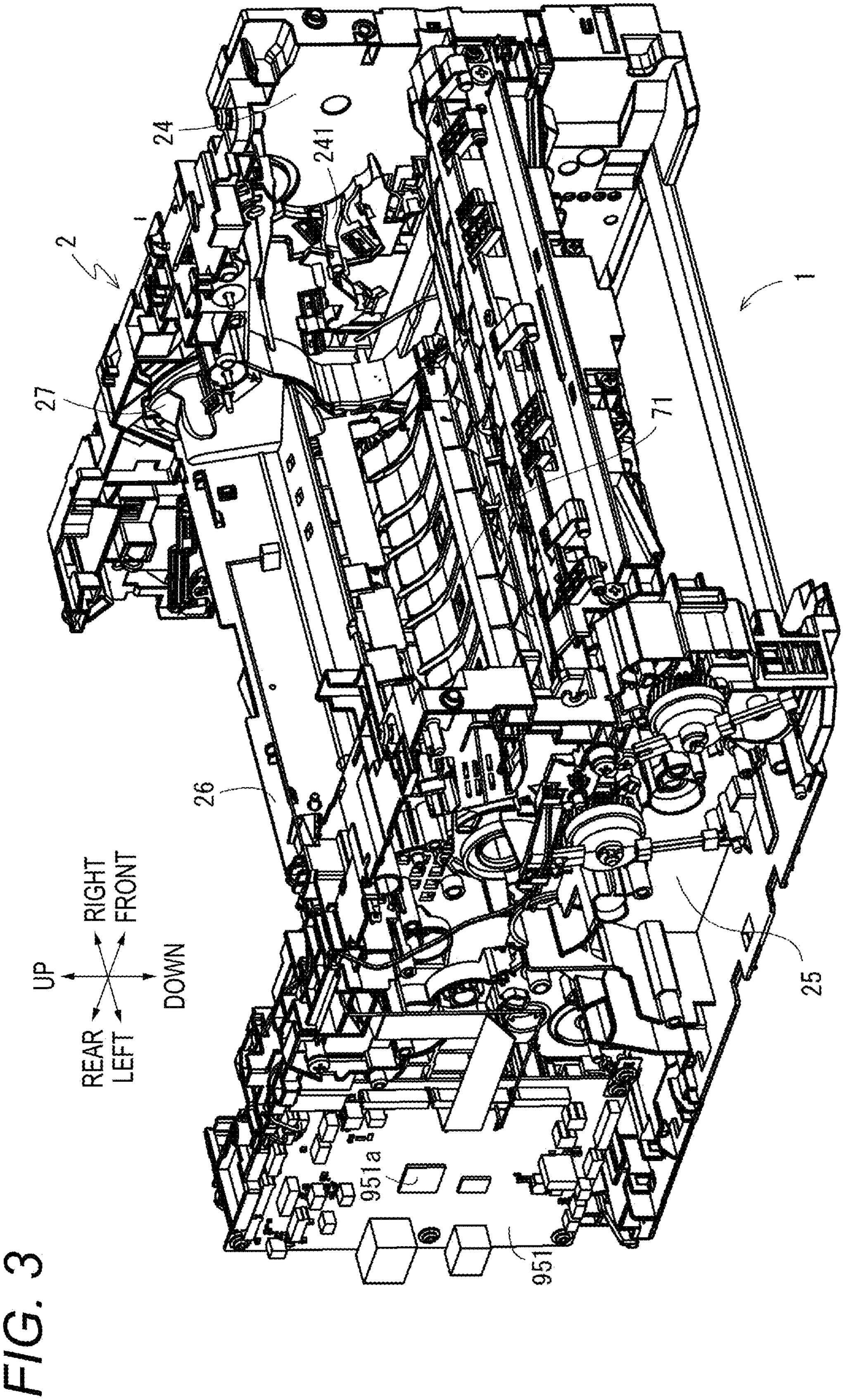
FIG. 3 is a left front perspective view showing a first body frame, a second body frame, an air duct, and a movable chute.
Figure 4:
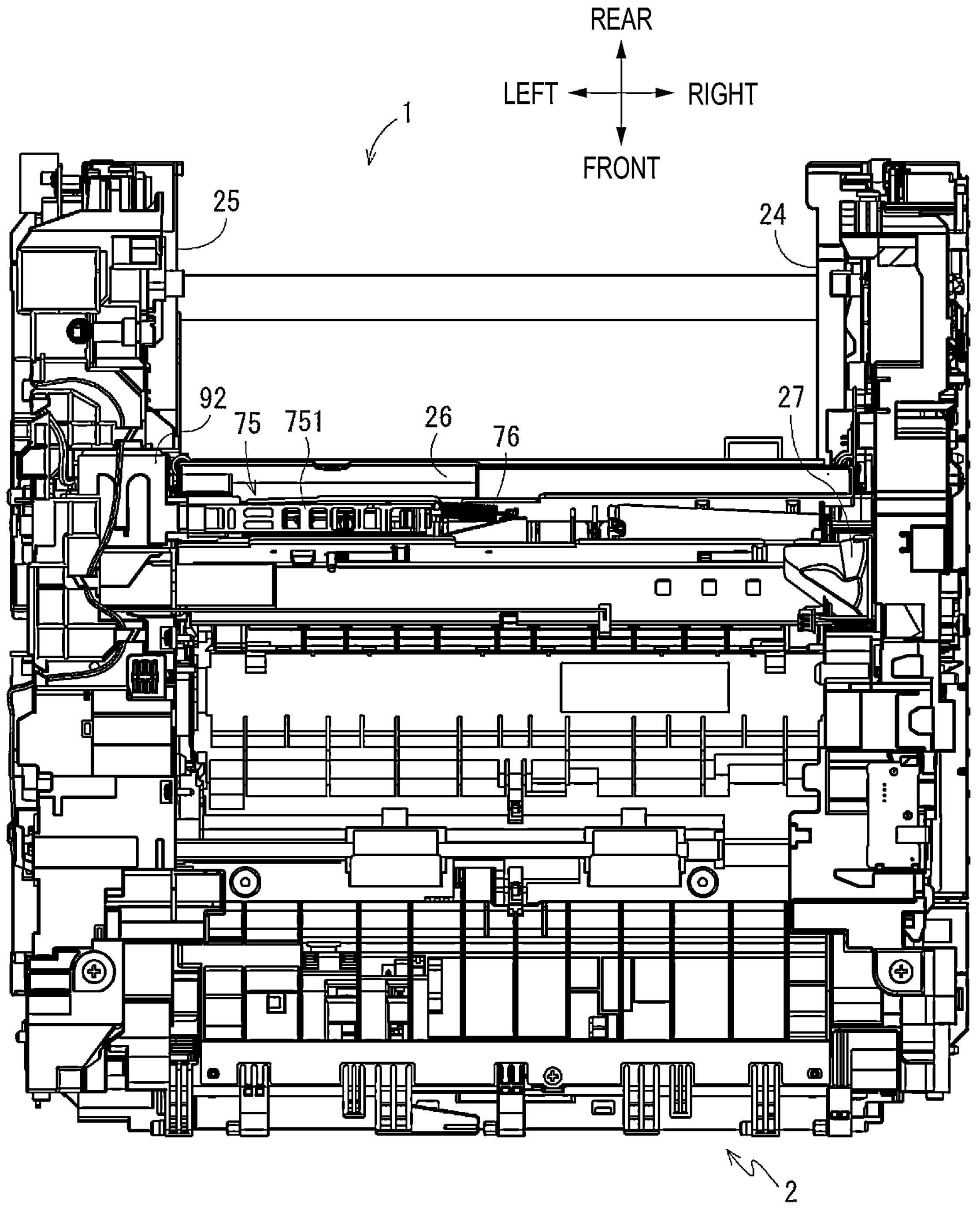
FIG. 4 is a plan view showing the first body frame, the second body frame, and the air duct.

As shown in FIGS. 2 to 4, the apparatus body 2 includes a first body frame 24 and a second body frame 25, which are spaced apart from each other in the left and right direction. The first body frame 24 is located at the right end portion of the apparatus body 2, and the second body frame 25 is located at the left end portion of the apparatus body 2. The first body frame 24 extends in the front and rear direction and the upper and lower direction, and is disposed in a posture where its plate surface faces in the left and right direction. The second body frame 25 extends in the front and rear direction and the upper and lower direction, and is disposed in a posture where its plate surface faces in the left and right direction.

The process cartridge 50 and the fixing device 6 are disposed between the first body frame 24 and the second body frame 25. The first body frame 24 is disposed on the right side of the process cartridge 50 and the fixing device 6, and the second body frame 25 is disposed on the left side of the process cartridge 50 and the fixing device 6. The process cartridge 50 is detachably supported on the first body frame 24 and the second body frame 25.

The first body frame 24 supports a fan 27 that exhausts air in the apparatus body 2 to the outside of the apparatus body 2. The second body frame 25 supports a control board 951 on which electric components such as a CPU 951*a* are mounted. The control board 951 constitutes a control unit 95 (see FIG. 26) for controlling the operation of the image forming apparatus 1.

An air duct 26 that extends in the left and right direction is disposed between the first body frame 24 and the second body frame 25. The air duct 26 is provided across the first body frame 24 and the second body frame 25. The right end portion of the air duct 26 is supported on the first body frame 24, and the left end portion of the air duct 26 is supported on the second body frame 25. The air duct 26 is located between the process cartridge 50 and the fixing device 6 in the front and rear direction.

The air duct 26 is disposed at a position overlapping with the fan 27 as viewed from the left and right direction. Air can flow through the air duct 26. The air duct 26 guides the air inside the apparatus body 2 toward the fan 27.

[Fixing Device]

Figure 5:
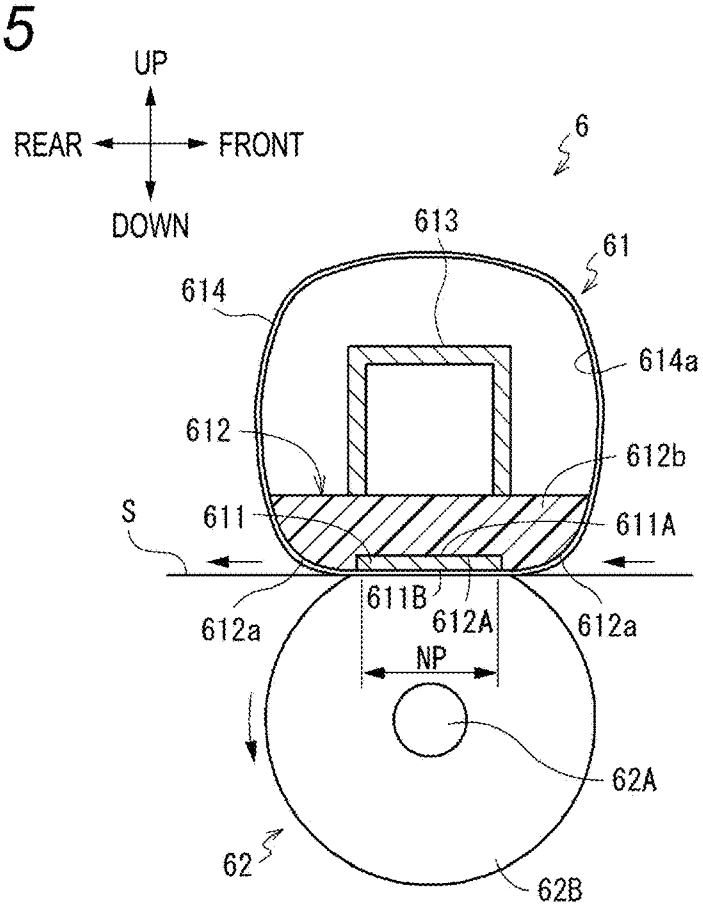
FIG. 5 is a side sectional view showing a fixing device.
Figure 6:
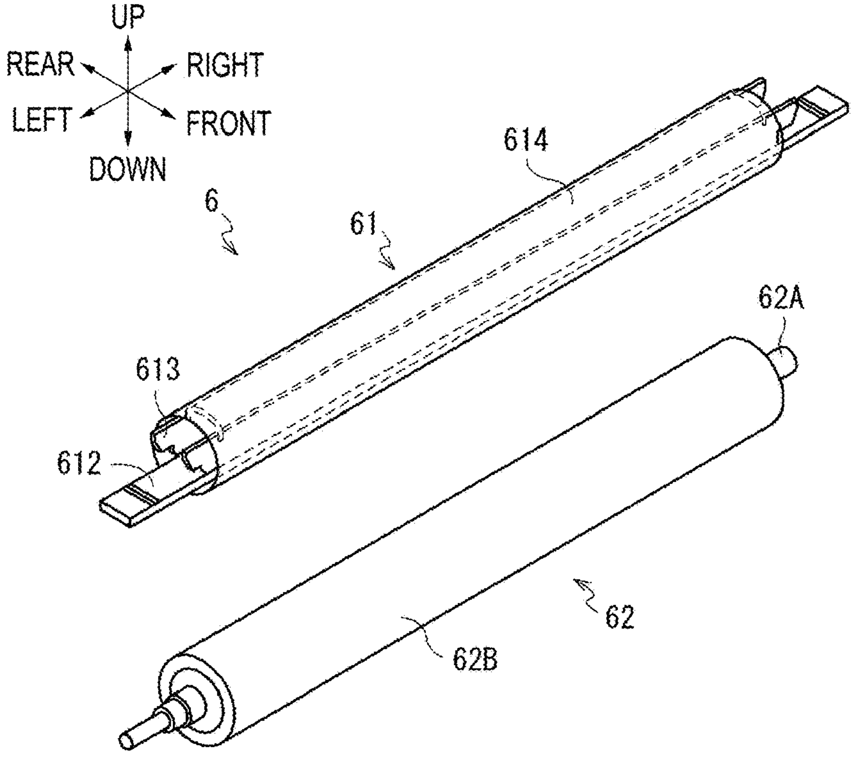
FIG. 6 is a perspective view showing a heating unit and a pressurizing roller of the fixing device.
Figure 7A:
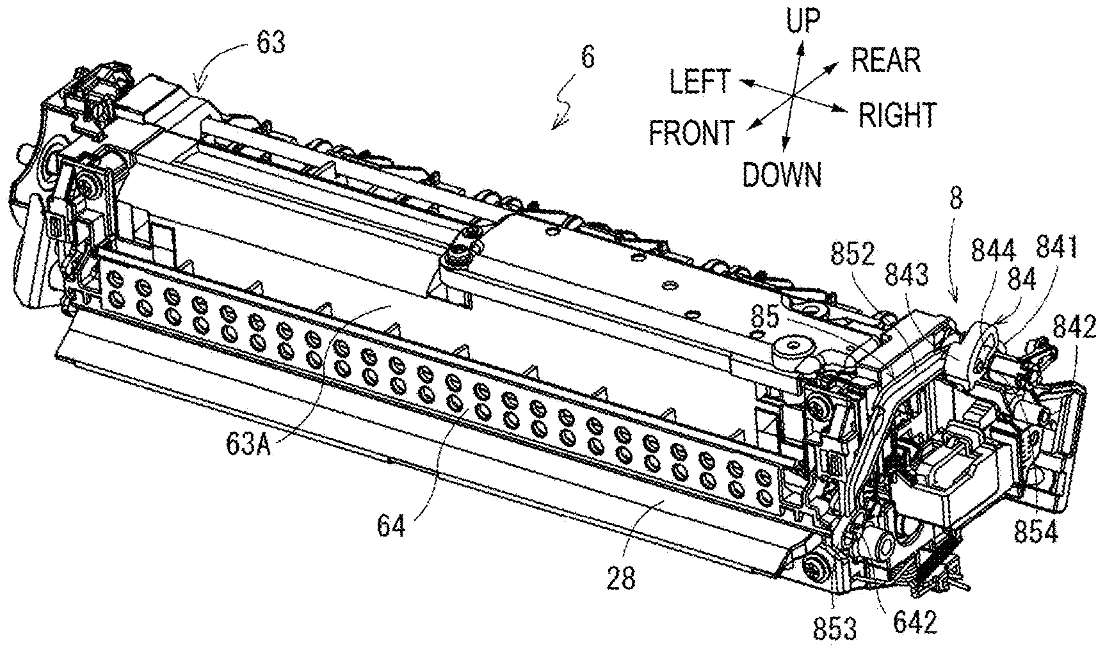
FIG. 7A is a perspective view showing the fixing device with a shutter at a closed position.
Figure 7B:
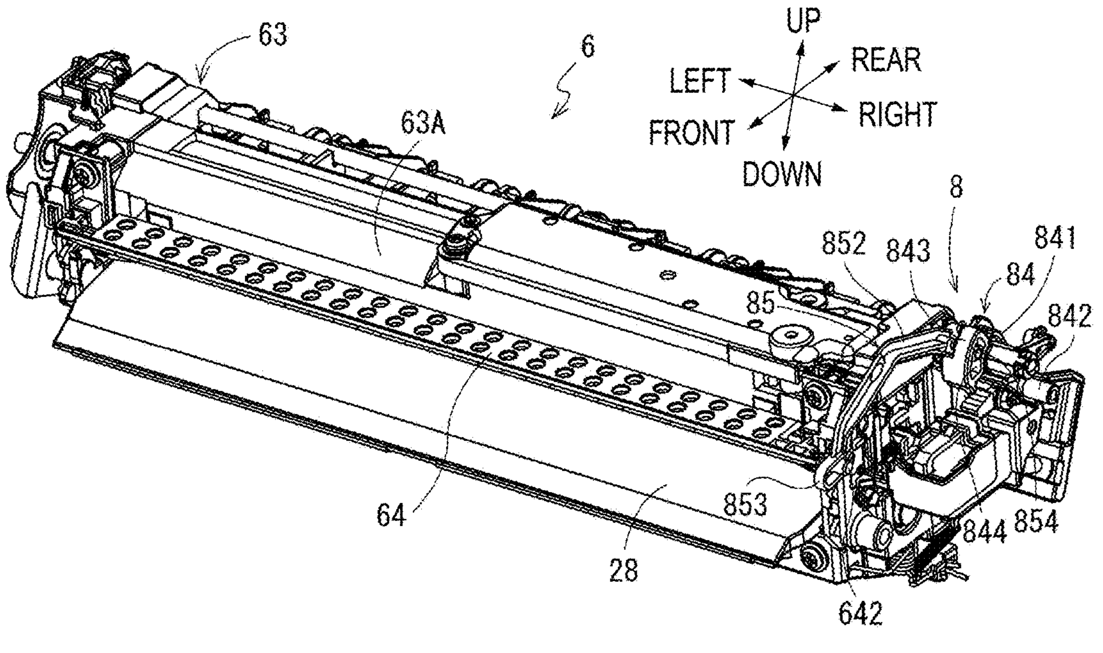
FIG. 7B is a perspective view showing the fixing device with the shutter at an opened position.

As shown in FIGS. 5 and 6, the heating unit 61 of the fixing device 6 includes a heater 611, a holder 612, a stay 613, and a belt 614. The heater 611 is a flat plate heater extending in the left and right direction. The heater 611 has a first surface 611A, and a second surface 611B opposes the first surface 611A, and the first surface 611A is supported on the holder 612.

The holder 612 is made of, for example, a resin member and has a guide surface 612*a* and a support wall 612*b*. The guide surface 612*a* contacts an inner peripheral surface 614*a* of the belt 614 to guide the belt 614. The support wall 612*b* has a support surface 612A that supports the heater 611. The support surface 612A of the support wall 612*b* abuts against the first surface 611A of the heater 611. The stay 613 is a member that supports the holder 612, and is formed by bending a plate material having greater rigidity than the holder 612, such as a steel plate, into a generally U shape in a sectional view.

The belt 614 is an endless belt having heat resistance and flexibility, and has a metal tube made of metal such as stainless steel, and a fluoroplastic layer covering the metal tube. The heater 611, the holder 612, and the stay 613 are arranged inside the belt 614. The belt 614 is configured to rotate around the heater 611, the holder 612, and the stay 613. The inner peripheral surface 614*a* of the belt 614 is in contact with the heater 611.

The pressurizing roller 62 has a metallic shaft 62A, and an elastic layer 62B covering the shaft 62A. The pressurizing roller 62 is pressed against the heater 611 via the belt 614. The pressurizing roller 62 and the heater 611 sandwich the belt 614 to form a nip NP for heating and pressurizing the sheet S. That is, the pressurizing roller 62 forms the nip NP together with the heater 611, and in the nip NP, the pressurizing roller 62 heats and pressurizes the sheet S together with the heater 611.

The pressurizing roller 62 is configured to be rotationally driven by a driving force transmitted from a motor included in the image forming apparatus 1. As the pressurizing roller 62 is rotationally driven, the belt 614 is rotationally driven by a friction force between the pressurizing roller 62 and the belt 614 or the sheet S sandwiched in the nip NP. As a result, the sheet S onto which the toner image is transferred is conveyed between the pressurizing roller 62 and the heated belt 614, so that the toner image is thermally fixed.

As shown in FIG. 1 and FIGS. 7A to 9B, the fixing device 6 includes a fixing frame 63 that covers the heating unit 61 and the pressurizing roller 62, and a fixing shutter 64 that is supported on the fixing frame 63. The fixing frame 63 holds the heating unit 61 and the pressurizing roller 62. The fixing frame 63 covers the periphery of the heating unit 61 and the pressurizing roller 62. The fixing frame 63 has a first opening 63*a* formed upstream of the heating unit 61 and the pressurizing roller 62 in the sheet conveying direction, and a second opening 63*b* formed downstream of the heating unit 61 and the pressurizing roller 62 in the sheet conveying direction.

The fixing frame 63 has an upper frame 63A and a lower frame 63B. The upper frame 63A is located above the lower frame 63B. The upper frame 63A covers the heating unit 61, and the lower frame 63B covers the pressurizing roller 62.

The fixing shutter 64 is located upstream of the first opening 63*a* in the fixing frame 63 in the sheet conveying direction, and has a rotating shaft 641 extending in the left and right direction and a connecting shaft 642 protruding in a direction parallel to the rotating shaft 641. The rotating shaft 641 is rotatably supported on the fixing frame 63. The rotating shaft 641 is provided on both the left and right end portions of the fixing shutter 64, and the connecting shaft 642 protrudes rightward from the right end portion of the fixing shutter 64.

The fixing shutter 64 is configured to be rotatable about the rotating shaft 641. By rotating the fixing shutter 64 about the rotating shaft 641, the fixing shutter 64 is movable between a closed position (position shown in FIGS. 7A, 8A, and 9A) where the first opening 63*a* is closed, and an opened position (position shown in FIGS. 7B, 8B, and 9B) where the first opening 63*a* is opened. When the fixing shutter 64 is at the closed position, the nip NP between the heating unit 61 and the pressurizing roller 62 is covered by the fixing shutter 64. When the fixing shutter 64 is at the opened position, the nip NP between the heating unit 61 and the pressurizing roller 62 is exposed to the outside of the fixing frame 63 through the first opening 63*a*.

Further, the fixing shutter 64 at the closed position covers the upstream side of the heating unit 61 in the sheet conveying direction, and the fixing shutter 64 at the opened position opens the upstream side of the heating unit 61 in the sheet conveying direction. In other words, the fixing shutter 64 is movable between the closed position where it covers the upstream side of the heating unit 61 in the sheet conveying direction, and the opened position where it opens the upstream side of the heating unit 61 in the sheet conveying direction.

Meanwhile, in the present embodiment, the fixing device 6 includes the heating unit 61 having the heater 611 and the belt 614, and the pressurizing roller 62. However, the fixing device 6 may be configured to include a heating roller with a built-in heater, and a pressurizing roller pressed against the heating roller. Further, the fixing device 6 may be configured to include a heating roller with a built-in heater, and a pressurizing belt pressed against the heating roller by an elastic member.

[Drum Shaft]

Figure 10:
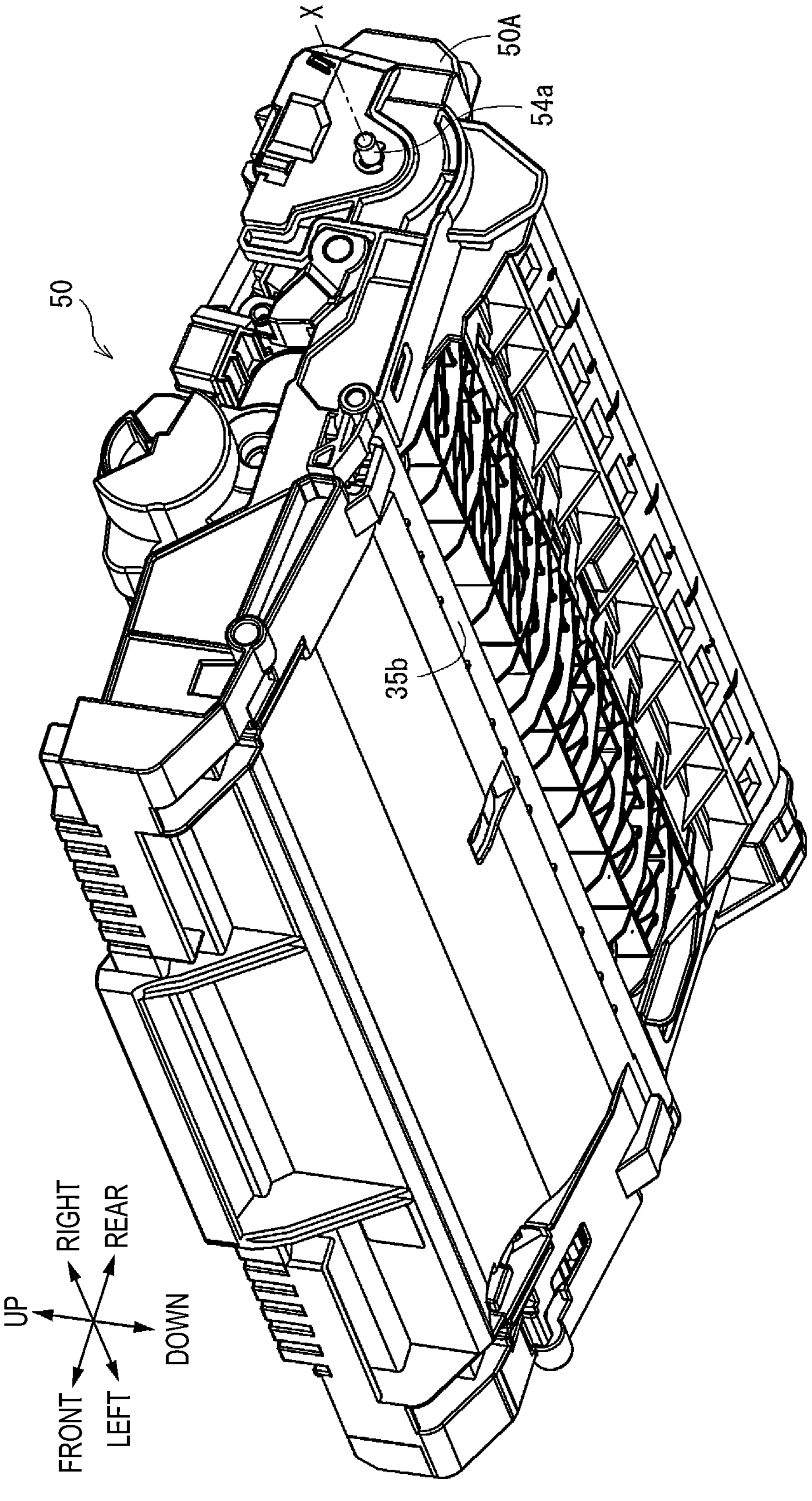
FIG. 10 is a perspective view showing a process cartridge.
Figure 11:
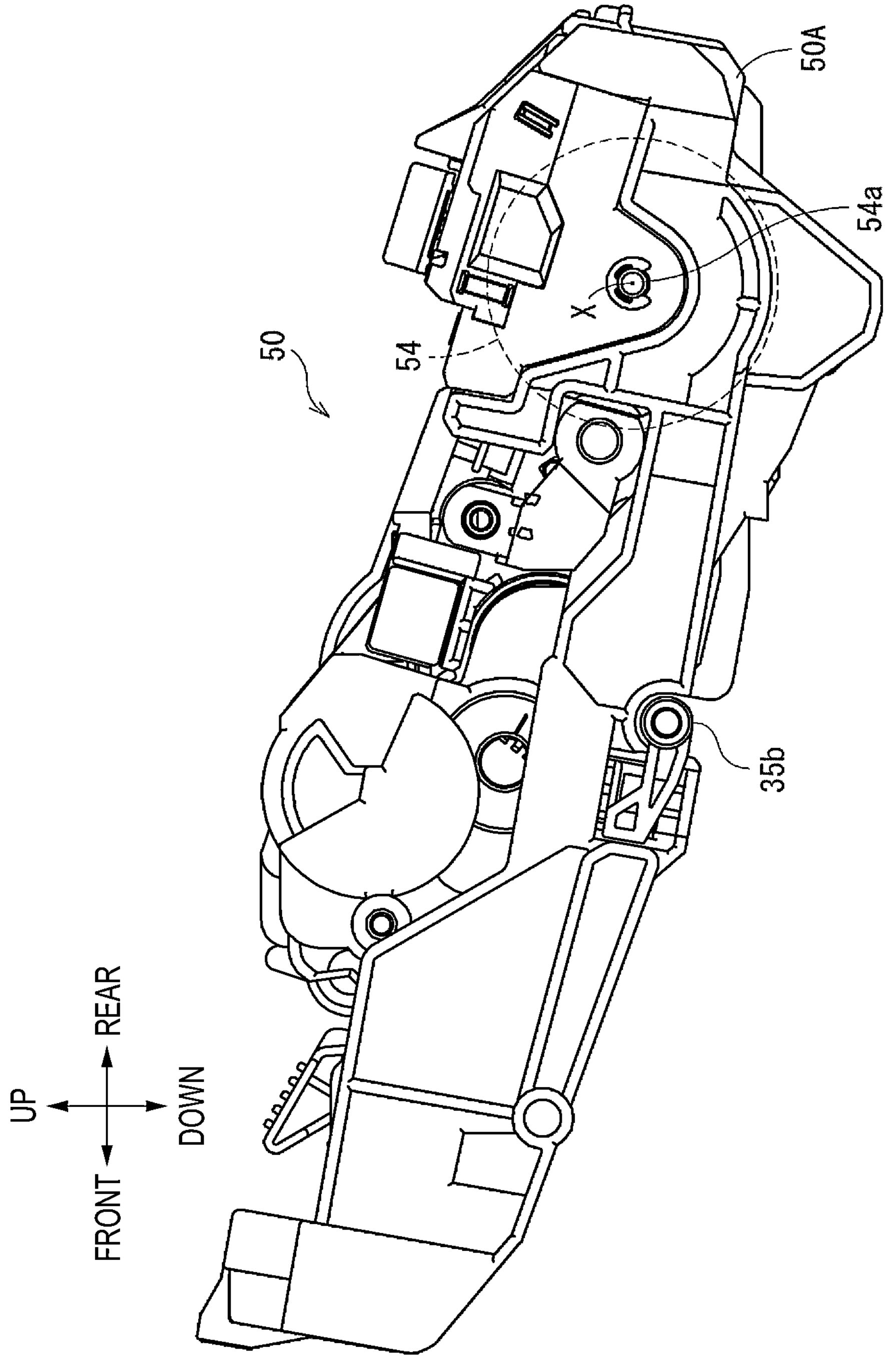
FIG. 11 is a side view showing the process cartridge.

As shown in FIGS. 10 and 11, the drum shaft 54*a* of the photosensitive drum 54 protrudes from the right end portion of the process cartridge 50 toward the right side along the direction of the axis center X. In other words, the drum shaft 54*a* protrudes toward the first body frame 24 along the direction of the axis center X.

[First Body Frame]

Figure 12:
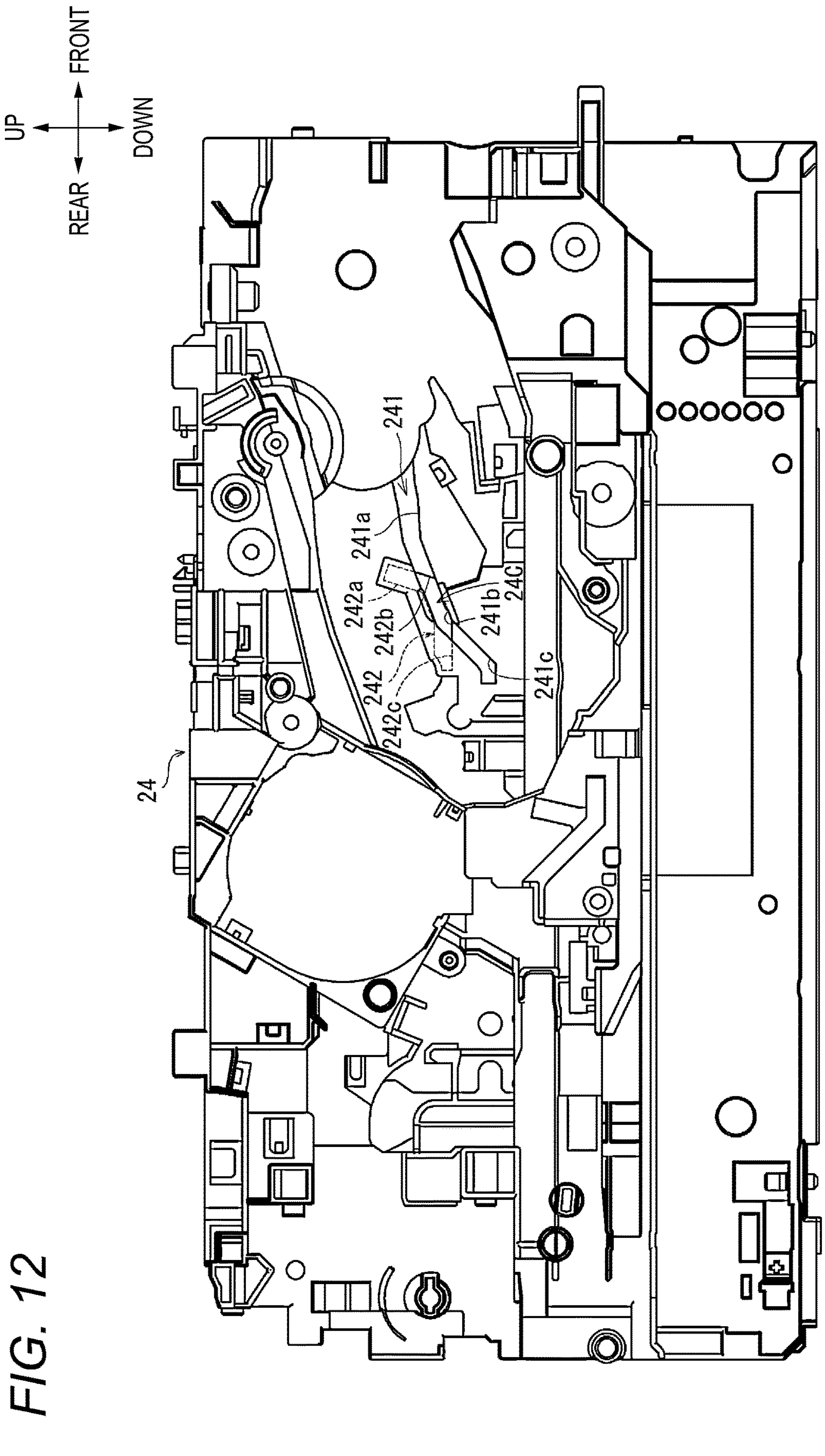
FIG. 12 is a side view showing the left side of the first body frame.
Figure 13:
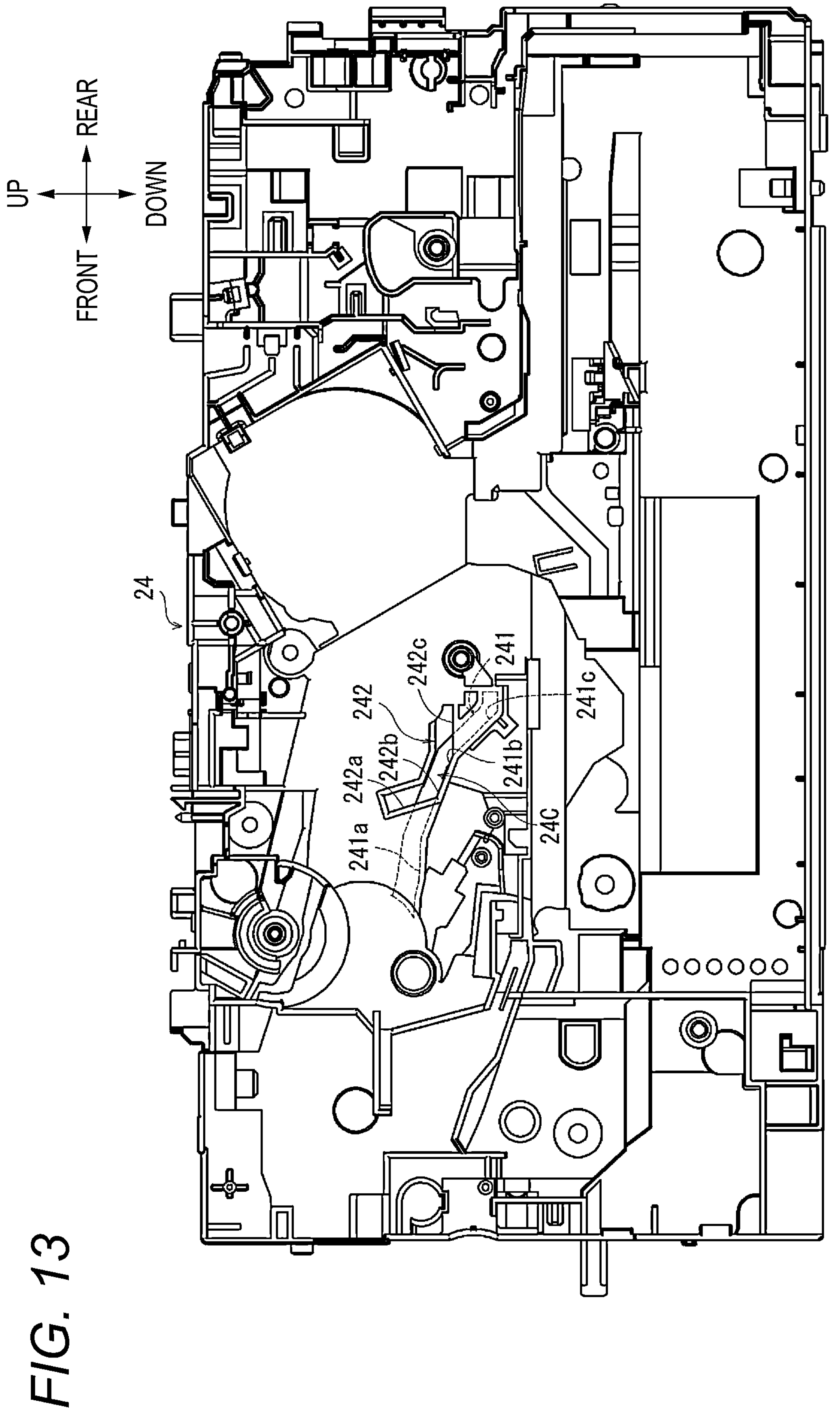
FIG. 13 is a side view showing the right side of the first body frame.

As shown in FIGS. 12 and 13, the first body frame 24 has a cartridge rail 241 and a contact piece rail 242. The cartridge rail 241 is formed in a groove shape that is open on the left side. The cartridge rail 241 extends in the front and rear direction and is inclined downward from the front side toward the rear side.

The drum shaft 54*a* of the photosensitive drum 54 can enter the cartridge rail 241. The cartridge rail 241 guides the drum shaft 54*a* when the process cartridge 50 is attached to the apparatus body 2 and when the process cartridge 50 is detached from the apparatus body 2. The drum shaft 54*a*, which is guided by the cartridge rail 241, enters the cartridge rail 241 from the left side. Meanwhile, the process cartridge 50 is attached to the apparatus body 2 from the front side toward the rear side, and is detached from the rear side toward the front side.

The contact piece rail 242 is formed in a groove shape that is open on the right side. The contact piece rail 242 extends in the front and rear direction and is inclined downward from the front side toward the rear side. The contact piece rail 242 is located on the right side of the cartridge rail 241 in the left and right direction.

The cartridge rail 241 has a front portion 241*a* located at a front part thereof, a rear portion 241*c* located at a rear part thereof, and a middle portion 241*b* located between the front portion 241*a* and the rear portion 241*c*. The contact piece rail 242 has a front portion 242*a* located at a front part thereof, a rear portion 242*c* located at a rear part thereof, and a middle portion 242*b* located between the front portion 242*a* and the rear portion 242*c*.

The middle portion 241*b* of the cartridge rail 241 and the middle portion 242*b* of the contact piece rail 242 overlap and communicate with each other. The middle portion 241*b* and the middle portion 242*b* form a through hole 24C penetrating through the first body frame 24 in the left and right direction. The drum shaft 54*a* enters the through hole 24C when the process cartridge 50 is attached to the apparatus body 2 and when the process cartridge 50 is detached from the apparatus body 2.

The front portion 242*a* of the contact piece rail 242 is located above the front portion 241*a* of the cartridge rail 241, and the rear portion 242*c* of the contact piece rail 242 is located above the rear portion 241*c* of the cartridge rail 241.

[Link]

As shown in FIGS. 8, 14A, 14B, and 15, the apparatus body 2 includes a shutter link 8 which can come into contact with the process cartridge 50 and which moves the fixing shutter 64 between the opened position and the closed position. The shutter link 8 is connected to the fixing shutter 64.

When the process cartridge 50 is attached to the apparatus body 2, the shutter link 8 comes into contact with the process cartridge 50 to move the fixing shutter 64 from the closed position to the opened position. When the process cartridge 50 is detached from the apparatus body 2, the shutter link 8 comes into contact with the process cartridge 50 to move the fixing shutter 64 from the opened position to the closed position. In other words, the shutter link 8 is configured to move the fixing shutter 64 between the opened position and the closed position in conjunction with the attachment and detachment of the process cartridge 50 relative to the apparatus body 2.

The shutter link 8 has a contact piece 80, a first rotational link 81, a linear link 82, a second rotational link 83, a third rotational link 84, an opening/closing link 85, and a coil spring 86.

The contact piece 80 moves in contact with the drum shaft 54*a* of the photosensitive drum 54. The contact piece 80 is slidably fitted on the contact piece rail 242, and the contact piece rail 242 guides the contact piece 80 that moves in contact with the drum shaft 54*a*.

The contact piece 80 has a body portion 801, a connecting portion 802, a first boss 803, and a second boss 804. The body portion 801 is formed of a plate-like member whose plate surface faces in the left and right direction. The connecting portion 802 is a protrusion that protrudes rightward from the right surface of the body portion 801.

The first boss 803 and the second boss 804 are protrusions that protrude leftward from the left surface of the body portion 801. The first boss 803 and the second boss 804 enter the contact piece rail 242 of the first body frame 24 from the right side and are guided by the contact piece rail 242.

The second boss 804 is located upstream of the first boss 803 in an attaching direction of the process cartridge 50. Note that the attaching direction refers to a direction in which the process cartridge 50 inserted into the apparatus body 2 moves toward the attachment position when the process cartridge 50 is attached in the apparatus body 2.

The first boss 803 comes into contact with the drum shaft 54*a* when the process cartridge 50 is attached to the apparatus body 2, and the second boss 804 comes into contact with the drum shaft 54*a* when the process cartridge 50 is detached from the apparatus body 2.

When the first boss 803 is located at the middle portion 242*b* (through hole 24C) of the contact piece rail 242, the first boss 803 comes into contact with the drum shaft 54*a* of the process cartridge 50 attached to the apparatus body 2. Further, when the second boss 804 is located at the middle portion 242*b* (through hole 24C) of the contact piece rail 242, the second boss 804 comes into contact with the drum shaft 54*a* of the process cartridge 50 detached from the apparatus body 2.

The first rotational link 81 is a substantially linear member that is rotatably connected to the contact piece 80. The first rotational link 81 has a fitting portion 811 which is located at the front end portion and to which the connecting portion 802 of the contact piece 80 is rotatably fitted, and a boss 812 which is located at the rear end portion and protrudes to the left side. The first rotational link 81 is disposed in an inclined posture where the fitting portion 811 is located above and forward of the boss 812. The first rotational link 81 is connected to the contact piece 80 by fitting the connecting portion 802 to the fitting portion 811, and rotates with the movement of the contact piece 80.

The linear link 82 is a substantially linear member that is rotatably connected to the first rotational link 81 and extends in the front and rear direction. The linear link 82 has a fitting portion 821 which is located at the front end portion and to which the boss 812 of the first rotational link 81 is rotatably fitted, and a connecting hole 822 located at the rear end portion. The linear link 82 is connected to the first rotational link 81 by fitting the boss 812 to the fitting portion 821, and moves linearly in the front and rear direction with the movement of the first rotational link 81.

The second rotational link 83 is connected to the linear link 82 and is supported on the first body frame 24. The second rotational link 83 has a support portion 831 that is rotatably supported on the first body frame 24, a first arm 832 extending substantially downward from the support portion 831, and a second arm 833 extending substantially upward from the support portion 831. An engagement pin 832*a* protruding to the left side is formed at the tip portion of the first arm 832, and a connecting hole 833*a* is formed at the tip portion of the second arm 833.

The engagement pin 832*a* of the first arm 832 enters the connecting hole 822 of the linear link 82 from the right side, and engages with the connecting hole 822 with the movement in the front and rear direction of the linear link 82. The second rotational link 83 is connected to the linear link 82 by the engagement of the engagement pin 832*a* with the connecting hole 822, and rotates about the support portion 831 with the movement of the linear link 82.

The third rotational link 84 is connected to the second rotational link 83, and is rotatably supported on a support shaft 65 of the fixing device 6. The third rotational link 84 has a support portion 841 that is rotatably supported on the support shaft 65, an engagement pin 842 that protrudes rightward from the support portion 841, an operating cam 843 that is formed at a different phase from the engagement pin 842 in a peripheral direction of the support portion 841, and a connecting hole 844 formed in the operating cam 843. The connecting hole 844 penetrates through the operating cam 843 along the left and right direction.

The engagement pin 842 of the third rotational link 84 enters the connecting hole 833*a* of the second rotational link 83 from the left side, and engages with the connecting hole 833*a* with the rotation of the second rotational link 83. The third rotational link 84 is connected to the second rotational link 83 by the engagement of the engagement pin 842 with the connecting hole 833*a*, and rotates about the support shaft 65 with the rotation of the second rotational link 83.

As shown in FIGS. 7A and 7B and FIGS. 8A and 8B, the opening/closing link 85 is connected to the third rotational link 84, and is rotatably supported on the support shaft 65 of the fixing device 6. The opening/closing link 85 moves with the movement of the third rotational link 84 to move the fixing shutter 64 of the fixing device 6 between the closed position and the opened position. The opening/closing link 85 is located at the right end portion of the fixing device 6, and has a support portion 851, an arm portion 852, an engagement portion 853, and an engagement pin 854.

The support portion 851 is rotatably supported on the support shaft 65 that protrudes rightward from the right end portion of the fixing frame 63. The arm portion 852 is an arm member that extends forward from the support portion 851. The engagement portion 853 is located at the front end portion of the arm portion 852, and has an oval engagement hole 853*a* that is long in the front and rear direction. The connecting shaft 642 that protrudes rightward from the right end portion of the fixing shutter 64 engages with the engagement hole 853*a*.

The opening/closing link 85 is rotatable about the support portion 851 in a direction in which the engagement portion 853 moves up and down. In a state in which the engagement portion 853 moves downward by rotating the opening/closing link 85, the fixing shutter 64 moves to the closed position (see FIGS. 7A and 8A). In a state in which the engagement portion 853 moves upward by rotating the opening/closing link 85, the fixing shutter 64 moves to the opened position (see FIGS. 7B and 8B).

The engagement pin 854 protrudes rightward from the end portion of the arm portion 852 on the side of the support portion 851. The engagement pin 854 of the opening/closing link 85 enters the connecting hole 844 of the third rotational link 84 from the left side.

The coil spring 86 is supported on the support portion 841 of the third rotational link 84. The coil spring 86 has an arm portion 861. The arm portion 861 extends from the inner diameter side to the outer diameter side of the connecting hole 844, and enters the connecting hole 844.

The arm portion 861 is located above the engagement pin 854 within the connecting hole 844. The coil spring 86 is rotatable with the rotation of the third rotational link 84. A lower end edge of the connecting hole 844 in the operating cam 843 of the third rotational link 84 forms an engagement surface 844*a*. The engagement surface 844*a* is located below the engagement pin 854.

The engagement surface 844*a* of the connecting hole 844 engages with the engagement pin 854 as the third rotational link 84 rotates to the side where the operating cam 843 moves upward. The arm portion 861 of the coil spring 86 engages with the engagement pin 854 as the third rotational link 84 rotates to the side where the operating cam 843 moves downward.

The opening/closing link 85 is connected to the third rotational link 84 by the engagement pin 854 being engaged with the arm portion 861 or an engagement surface 843*a*, and moves with the rotation of the third rotational link 84 to move the fixing shutter 64 between the closed position and the opened position.

In the image forming apparatus 1, when the process cartridge 50 is attached to or detached from the apparatus body 2, the contact piece 80 of the shutter link 8 comes into contact with the drum shaft 54*a* and moves along the contact piece rail 242, whereby a driving force is transmitted to the fixing shutter 64 via the shutter link 8, and the fixing shutter 64 moves between the closed position and the opened position.

In the present embodiment, the shutter link 8 has a configuration including the contact piece 80, the first rotational link 81, the linear link 82, the second rotational link 83, the third rotational link 84, the opening/closing link 85, and the coil spring 86, but is not limited to this configuration. The shutter link 8 may be configured as one link that is connected to the fixing shutter 64, and opens and closes the fixing shutter 64 by coming into contact with the process cartridge 50. Further, the movement of the shutter link 8 is not limited to rotation or sliding, and the shutter link 8 may be any type that opens and closes the fixing shutter 64 in an appropriate manner in response to the insertion and removal of the process cartridge 50.

[Pressing Part]

Figure 14A:
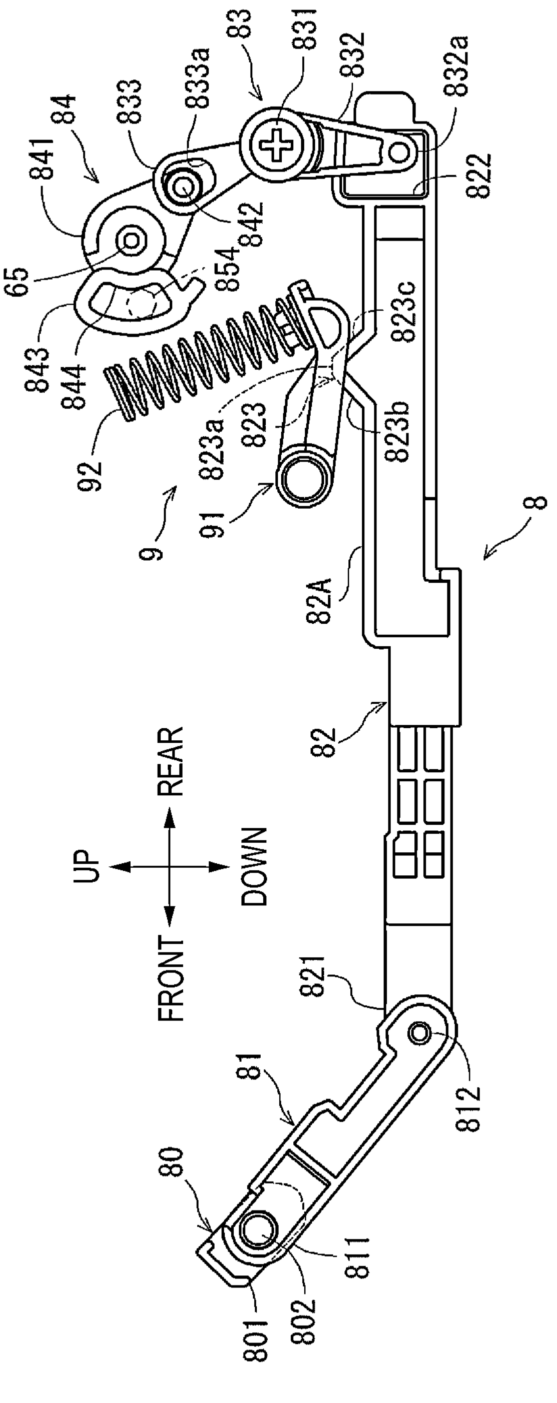
FIGS. 14A and 14B are side views showing a link in a state where a first boss of a contact piece is located at the middle portion of a contact piece rail, and a second boss is located at the front part of the contact piece rail.
Figure 14B:
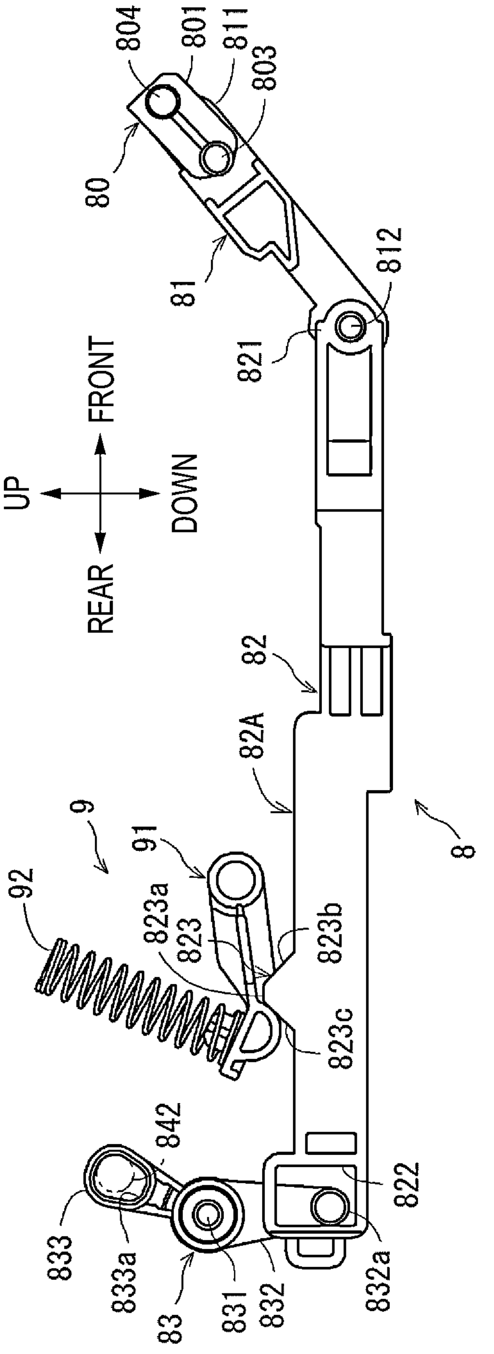
Figure 15:
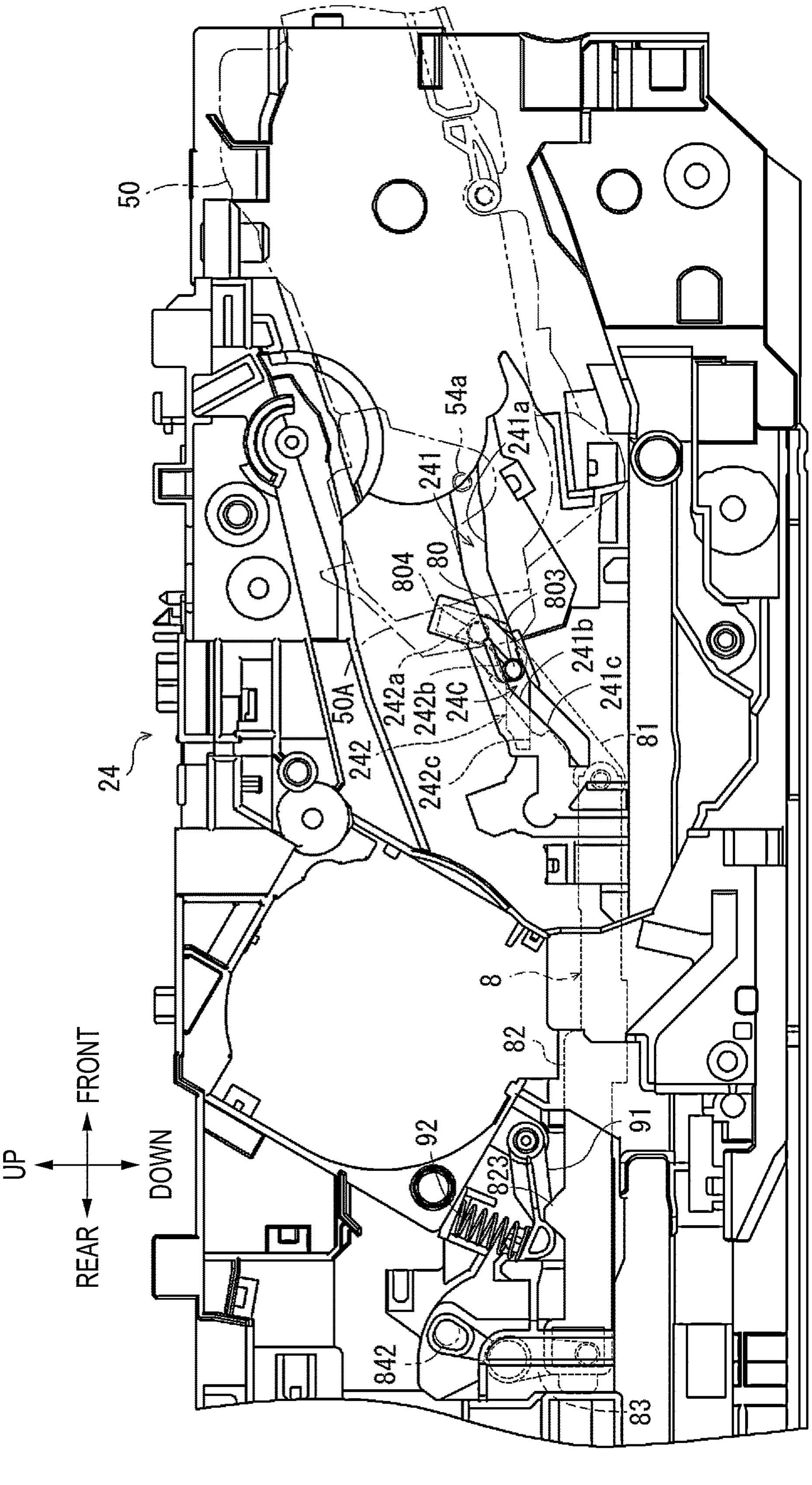
FIG. 15 is a side view showing the first body frame in a state in which the process cartridge is located at an installation start position, the first boss of the contact piece is located at the middle portion of the contact piece rail, and the second boss is located at the front part of the contact piece rail.

As shown in FIGS. 14A and 14B, the apparatus body 2 includes a pressing part 9. In the process in which the shutter link 8 moves the fixing shutter 64 from the closed position to the opened position, before the fixing shutter 64 is moved to the opened position, the pressing part 9 presses the shutter link 8 in a direction in which the fixing shutter 64 is at the opened position. In addition, the pressing part 9 presses the shutter link 8 to restrict the movement of the shutter link 8 which has moved the fixing shutter 64 to the opened position or the closed position.

The pressing part 9 has a pressing spring 92, and a pressing arm 91 that is pressed by the pressing spring 92 and comes into contact with an upper surface 82A of the linear link 82. The pressing spring 92 presses the tip of the pressing arm 91 toward the upper surface 82A of the linear link 82.

The upper surface 82A of the linear link 82 has a link protrusion 823 that protrudes upward. The link protrusion 823 is formed in a mountain shape that has a first pressable surface 823*a*, a second pressable surface 823*b*, and a third pressable surface 823*c*.

The first pressable surface 823*a* is located at the apex of the mountain shape and extends in a horizontal direction. The second pressable surface 823*b* is located on a front side of the first pressable surface 823*a* and is formed as an inclined surface that is inclined upward toward the rear side. The third pressable surface 823*c* is located on a rear side of the first pressable surface 823*a* and is formed as an inclined surface that is inclined downward toward the rear side.

By moving in the front and rear direction, the linear link 82 can be positioned at a position where the pressing arm 91 presses the first pressable surface 823*a*, a position where the pressing arm 91 presses the second pressable surface 823*b*, and a position where the pressing arm 91 presses the third pressable surface 823*c*.

Since the first pressable surface 823*a* is a surface extending in the horizontal direction, when the pressing arm 91 presses the first pressable surface 823*a* from above, a pressing force by the pressing arm 91 acts neither backward nor forward.

Since the second pressable surface 823*b* is a surface that is inclined upward from below along a rearward direction, when the pressing arm 91 presses the second pressable surface 823*b* from above, the pressing force by the pressing arm 91 acts in the rearward direction. In addition, in a state in which the pressing arm 91 presses the second pressable surface 823*b* from above, the forward movement of the linear link 82 is restricted.

The third pressable surface 823*c* is a surface that is inclined downward from above along the rearward direction, when the pressing arm 91 presses the third pressable surface 823*c* from above, the pressing force by the pressing arm 91 acts in a forward direction. In addition, in a state in which the pressing arm 91 presses the third pressable surface 823*c* from above, the rearward movement of the linear link 82 is restricted.

In the present embodiment, the pressing part 9 has the pressing spring 92 and the pressing arm 91 that is pressed by the pressing spring 92 and comes into contact with the upper surface 82A of the linear link 82, but is not limited to this configuration. The pressing part 9 may have a shape other than a spring shape or an arm shape as long as it is configured to press the shutter link 8.

[Operation of Link]

Next, the operation of the shutter link 8 will be described.

(Operation when Attaching Process Cartridge)

Figure 16:
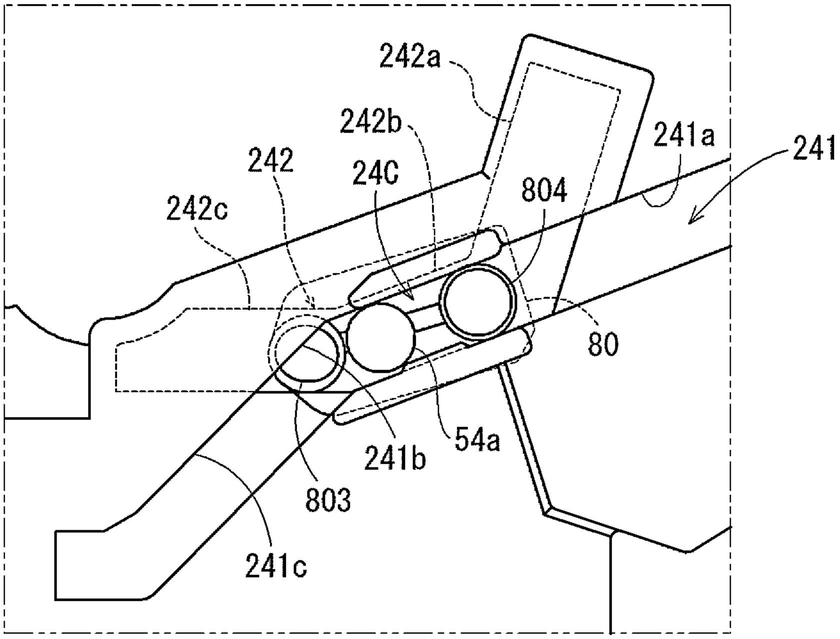
FIG. 16 is an enlarged side view showing a state in which a drum shaft is in contact with the contact piece, the rear portion of the first boss of the contact piece is partially located at the rear portion of the contact piece rail, and the second boss is located at the middle portion of the contact piece rail.

When the process cartridge 50 is attached to the apparatus body 2, the drum shaft 54*a* enters the front portion 241*a* of the cartridge rail 241 (see FIG. 15), and then enters the middle portion 241*b* (through hole 24C), and comes into contact with the first boss 803 of the contact piece 80. As shown in FIG. 16, the contact piece 80 in contact with the drum shaft 54*a* is pressed by the drum shaft 54*a* and moves downstream in the attaching direction of the process cartridge 50.

When the contact piece 80 moves, the first rotational link 81 moves rearward while rotating in a direction in which the inclination angle with respect to the horizontal direction becomes smaller. When the first rotational link 81 rotates and moves, the linear link 82 connected to the first rotational link 81 moves linearly rearward.

When the linear link 82 moves rearward, the connecting hole 822 of the linear link 82 engages with the engagement pin 832*a* of the second rotational link 83, and the second rotational link 83 rotates in a direction in which the engagement pin 832*a* moves rearward. When the second rotational link 83 rotates, the connecting hole 833*a* of the second rotational link 83 engages with the engagement pin 842 of the third rotational link 84, and the third rotational link 84 rotates in a direction in which the engagement pin 842 moves forward.

When the third rotational link 84 rotates, the engagement surface 844*a* of the connecting hole 844 in the operating cam 843 engages with the engagement pin 854 of the opening/closing link 85 from below. As the engagement surface 844*a* of the connecting hole 844 engages with the engagement pin 854, the opening/closing link 85 rotates in a direction in which the engagement portion 853 moves upward, and the fixing shutter 64 moves from the closed position toward the opened position.

Figure 17:
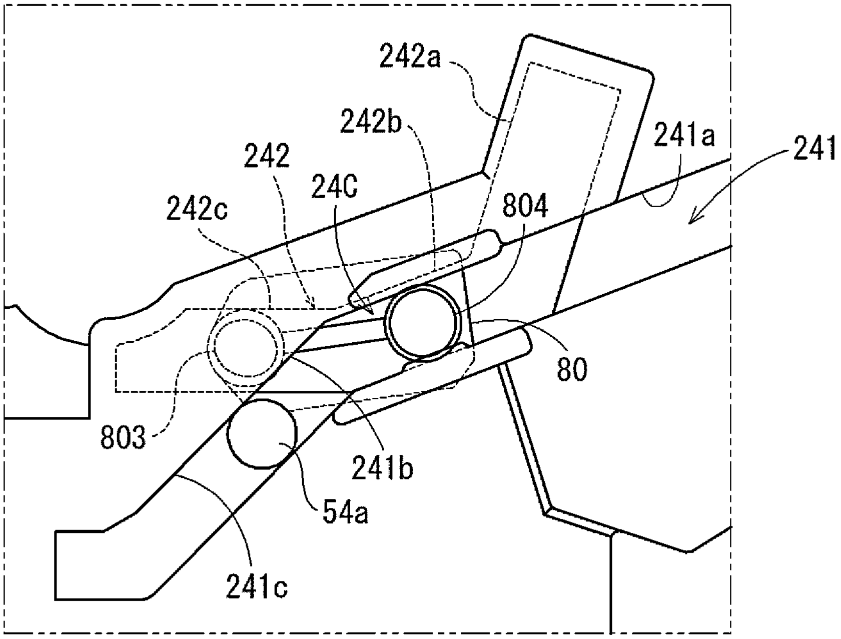
FIG. 17 is an enlarged side view showing a state in which the drum shaft is moved from the middle portion to the rear portion of a cartridge rail, and the contact piece and the drum shaft are separated from each other.

As shown in FIG. 17, the drum shaft 54*a*, which has caused the contact piece 80 to move rearward in the middle portion 241*b* (through hole 24C) of the cartridge rail 241, moves from the middle portion 241*b* to the rear portion 241*c* of the cartridge rail 241, and moves away from the contact piece 80.

Figure 18A:
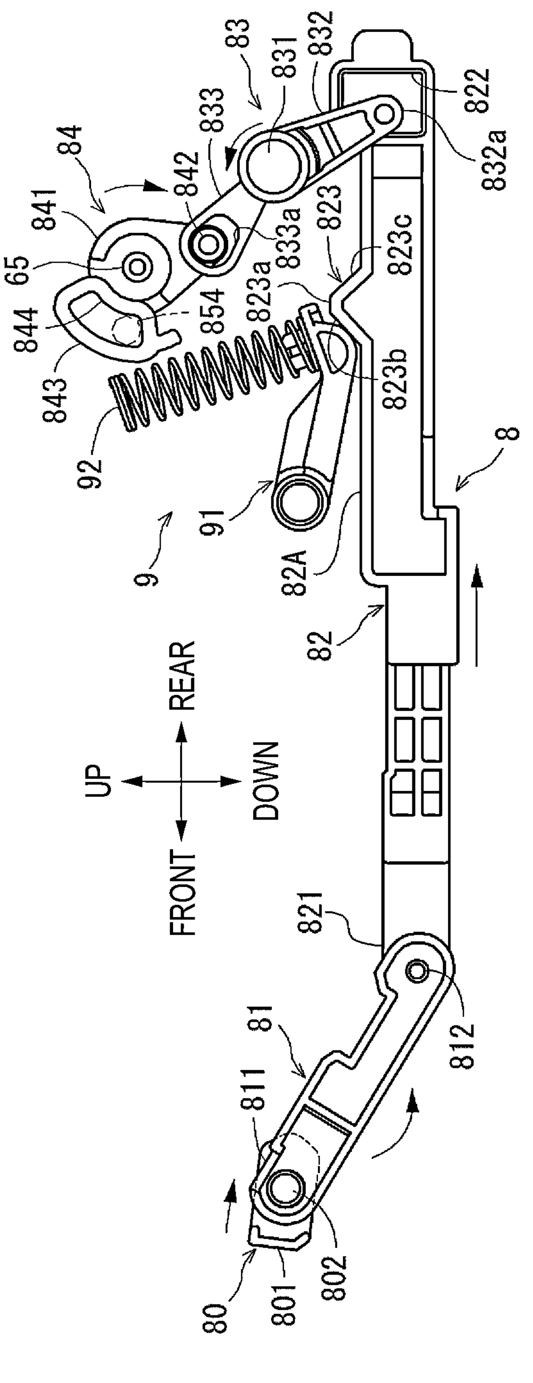
FIGS. 18A and 18B are side views showing a state in which a linear link is moved rearward by a pressing force from a pressing arm.
Figure 18B:
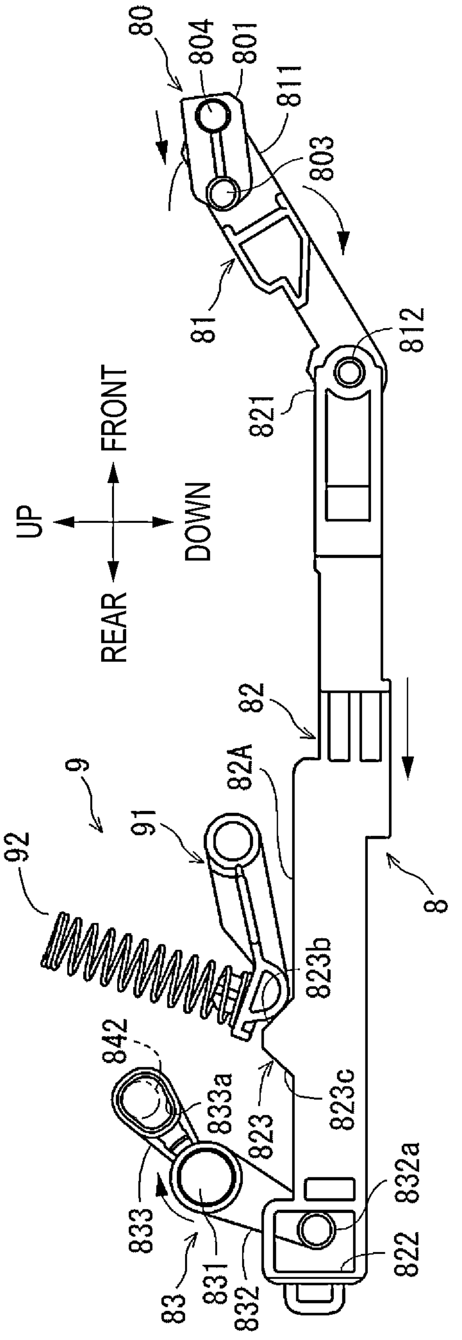

As shown in FIGS. 18A and 18B, after the drum shaft 54*a* comes into contact with the contact piece 80 and the linear link 82 moves rearward, in a state in which the drum shaft 54*a* and the contact piece 80 are spaced apart from each other, the pressing arm 91 is in contact with the second pressable surface 823*b* of the linear link 82.

After the contact piece 80 and the drum shaft 54*a* are spaced apart from each other, the drum shaft 54*a* does not move the contact piece 80. However, since the pressing arm 91 is in contact with the second pressable surface 823*b*, a pressing force is applied from the pressing arm 91 to the linear link 82 in a direction toward the second position, and the linear link 82 moves rearward.

Figure 8A:
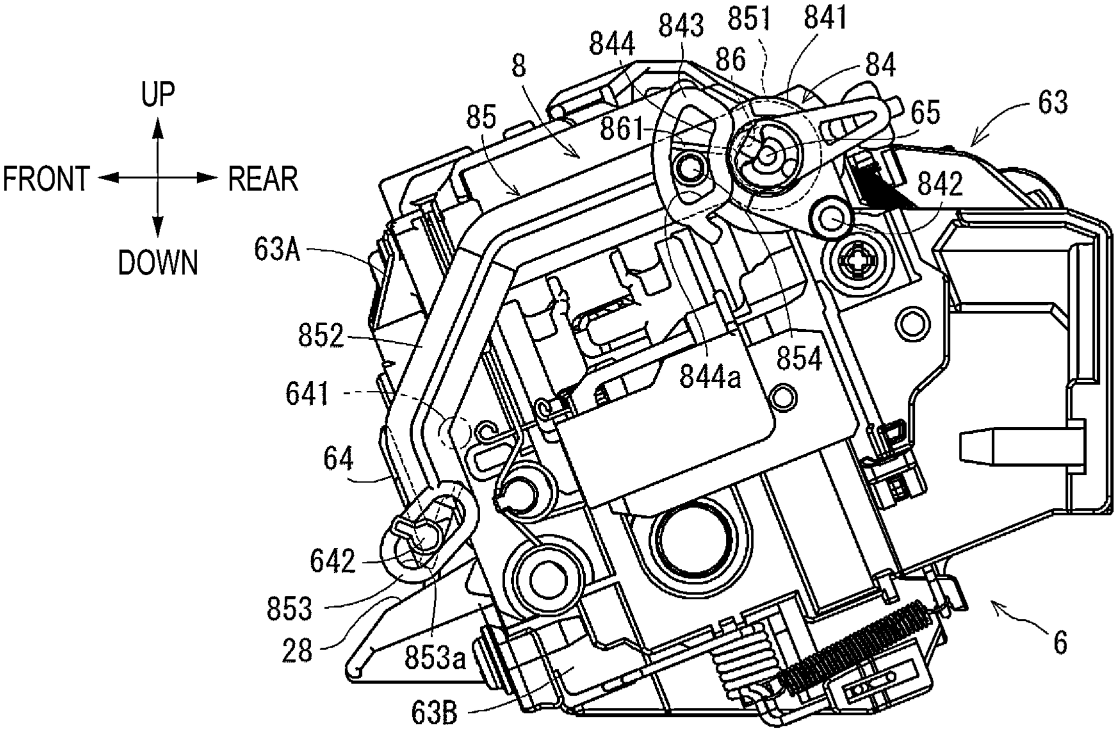
FIG. 8A is a side view showing the fixing device with the shutter at the closed position.
Figure 8B:
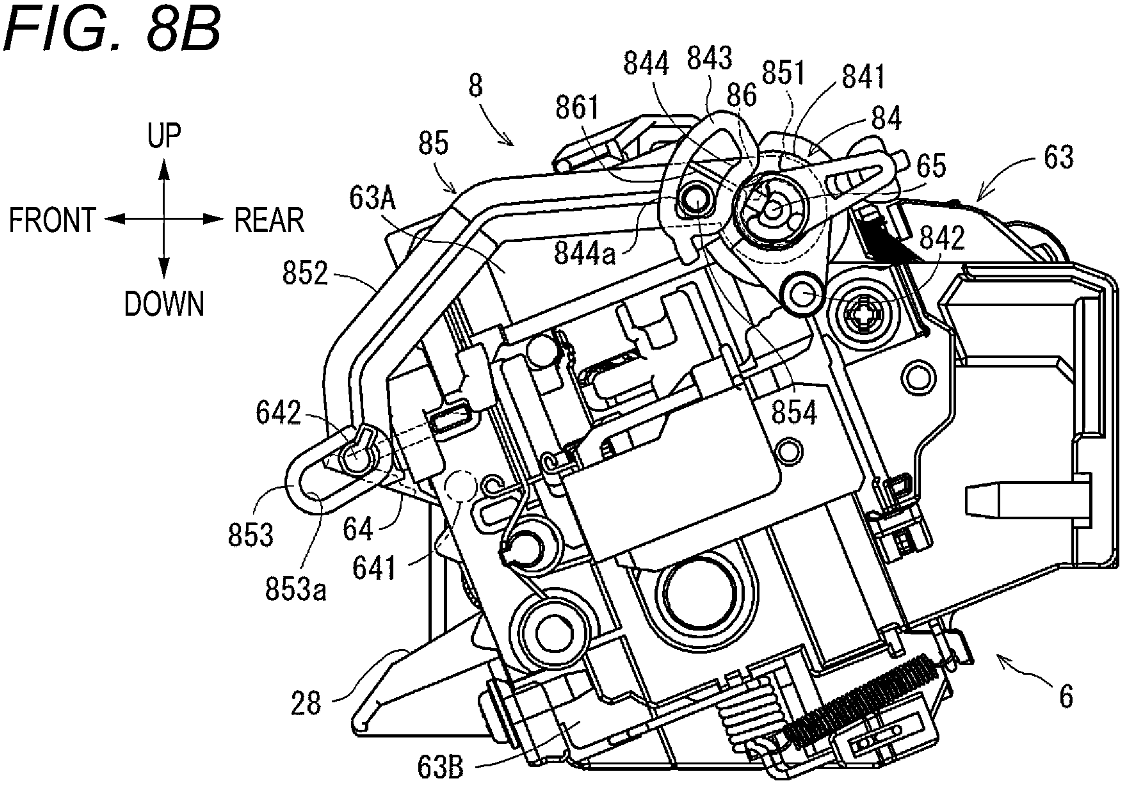
FIG. 8B is a side view showing the fixing device with the shutter at the opened position.
Figure 9A:
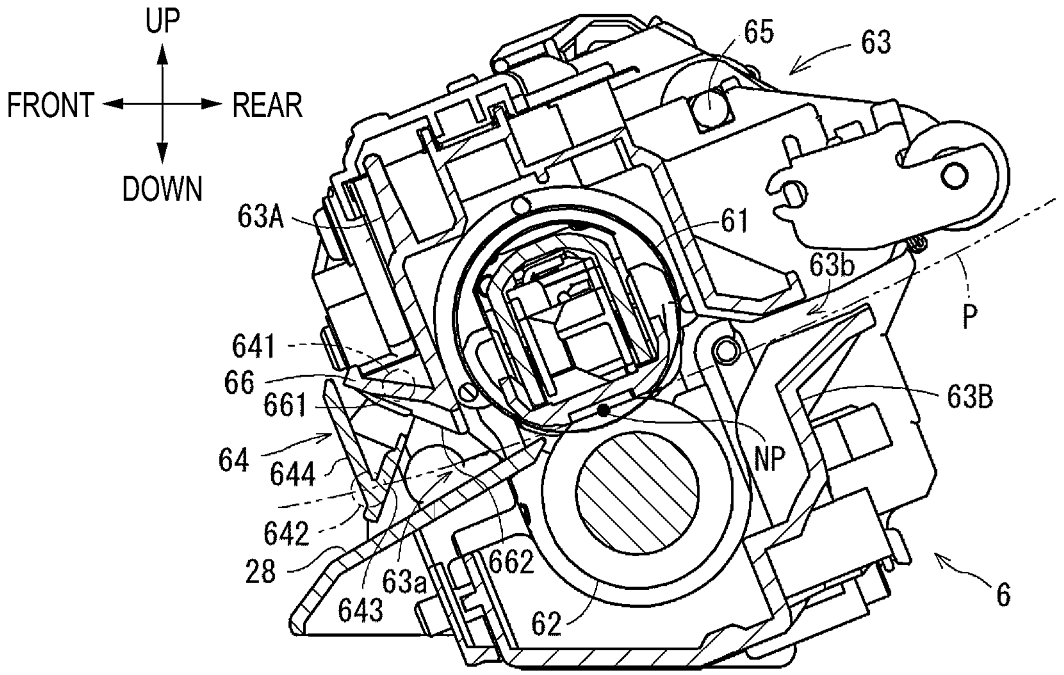
FIG. 9A is a side sectional view showing the fixing device with the shutter at the closed position.
Figure 9B:
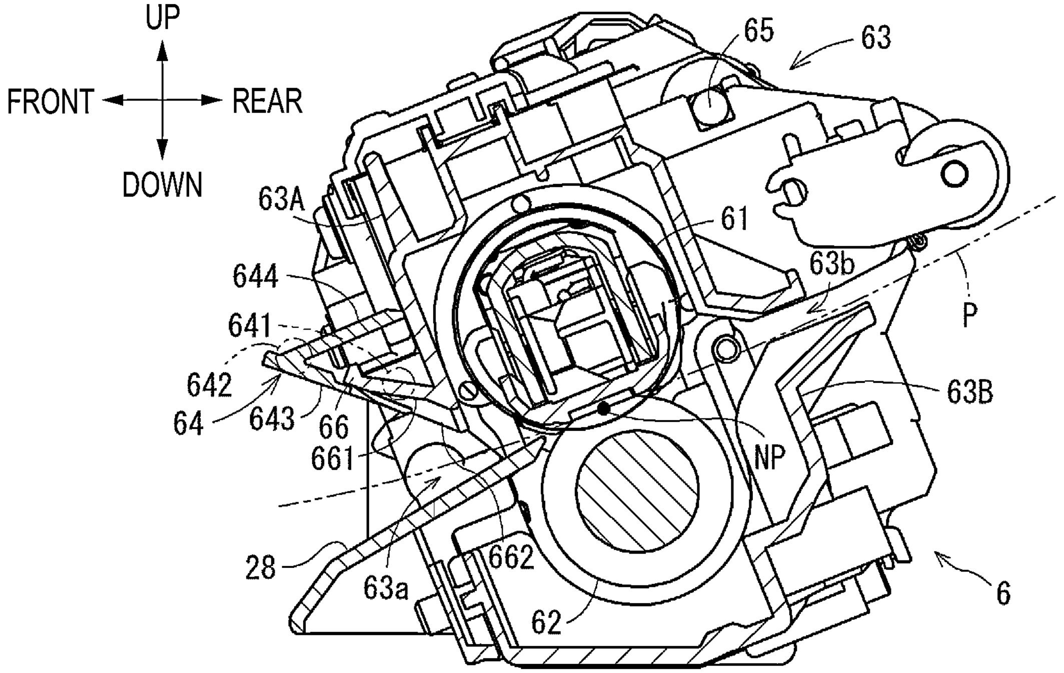
FIG. 9B is a side sectional view showing the fixing device with the shutter at the opened position.
Figure 19:
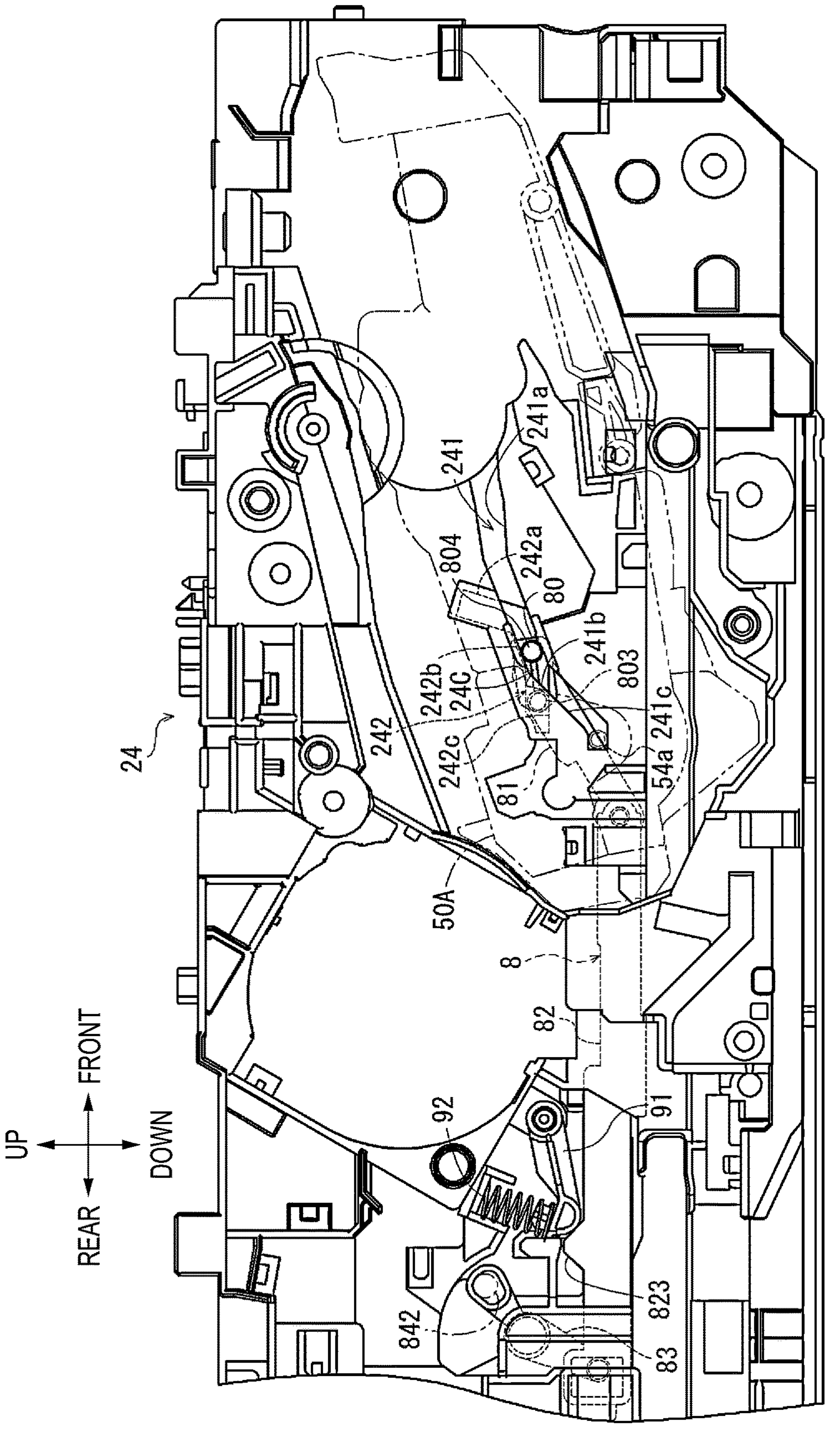
FIG. 19 is a side view showing the first body frame in a state where the process cartridge reaches the installation position after the drum shaft is separated from the contact piece.

As shown in FIG. 8B, when the linear link 82 moves rearward by the pressing force from the pressing arm 91, the opening/closing link 85 rotates in a direction in which the engagement portion 853 moves upward, and the fixing shutter 64 moves to the opened position. As shown in FIG. 19, in a state in which the process cartridge 50 is attached to the apparatus body 2, the drum shaft 54*a* spaced apart from the contact piece 80 moves to the attachment position in which the drum shaft 54*a* is located at the rear end of the rear portion 241*c* of the cartridge rail 241.

(Operation when Detaching Process Cartridge)

When the process cartridge 50 is detached, the shutter link 8 performs operations in a manner conversely to operations performed when the process cartridge 50 is attached.

When the process cartridge 50 at the attachment position shown in FIG. 19 is detached forward from the apparatus body 2, the drum shaft 54*a* moves toward the downstream side in a detaching direction within the rear portion 241*c* of the cartridge rail 241. Note that the detaching direction refers to a direction in which the process cartridge 50 being detached from the apparatus body 2 moves toward the outside of the apparatus body 2 when the process cartridge 50 is detached from the apparatus body 2. As shown in FIG. 16, when the drum shaft 54*a* moving within the cartridge rail 241 reaches the middle portion 241*b* (through hole 24C), the drum shaft 54*a* comes into contact with the second boss 804 of the contact piece 80.

The contact piece 80 in contact with the drum shaft 54*a* moves toward the downstream side in the detaching direction of the process cartridge 50 within the middle portion 242*b* (through hole 24C). When the contact piece 80 moves, the first rotational link 81 moves forward while rotating in a direction in which the inclination angle with respect to the horizontal direction becomes larger, and the linear link 82 moves linearly forward.

When the linear link 82 moves, the connecting hole 822 of the linear link 82 engages with the engagement pin 832*a* of the second rotational link 83, and the second rotational link 83 rotates in a direction in which the engagement pin 832*a* moves forward. When the second rotational link 83 rotates, the connecting hole 833*a* of the second rotational link 83 engages with the engagement pin 842 of the third rotational link 84, and the third rotational link 84 rotates in a direction in which the engagement pin 842 moves rearward.

When the third rotational link 84 rotates, the coil spring 86 rotates with the rotation of the third rotational link 84, and the arm portion 861 of the coil spring 86 engages with the engagement pin 854 of the opening/closing link 85 from above. As the arm portion 861 engages with the engagement pin 854, the opening/closing link 85 rotates in a direction in which the engagement portion 853 moves downward. As a result, the fixing shutter 64 moves from the opened position toward the closed position. In a state in which the process cartridge 50 is detached from the apparatus body 2, the fixing shutter 64 is positioned at the closed position.

As described above, the shutter link 8 connected to the fixing shutter 64 is configured to move the fixing shutter 64 between the opened position and the closed position in conjunction with the operation of attaching and detaching the process cartridge 50 with respect to the apparatus body 2. As a result, the fixing shutter 64 can be opened and closed by the operation of attaching and detaching the process cartridge 50 with respect to the apparatus body 2 without performing a separate operation for opening and closing the fixing shutter 64.

Meanwhile, in the present embodiment, the fixing shutter 64 is opened and closed by the drum shaft 54*a* of the process cartridge 50 coming into contact with the shutter link 8, but is not limited to this configuration. Another part of the process cartridge 50 may come into contact with the shutter link 8.

[Positional Relationship between Fixing Chute, Fixing Guide, and Fixing Shutter]

Figure 20:
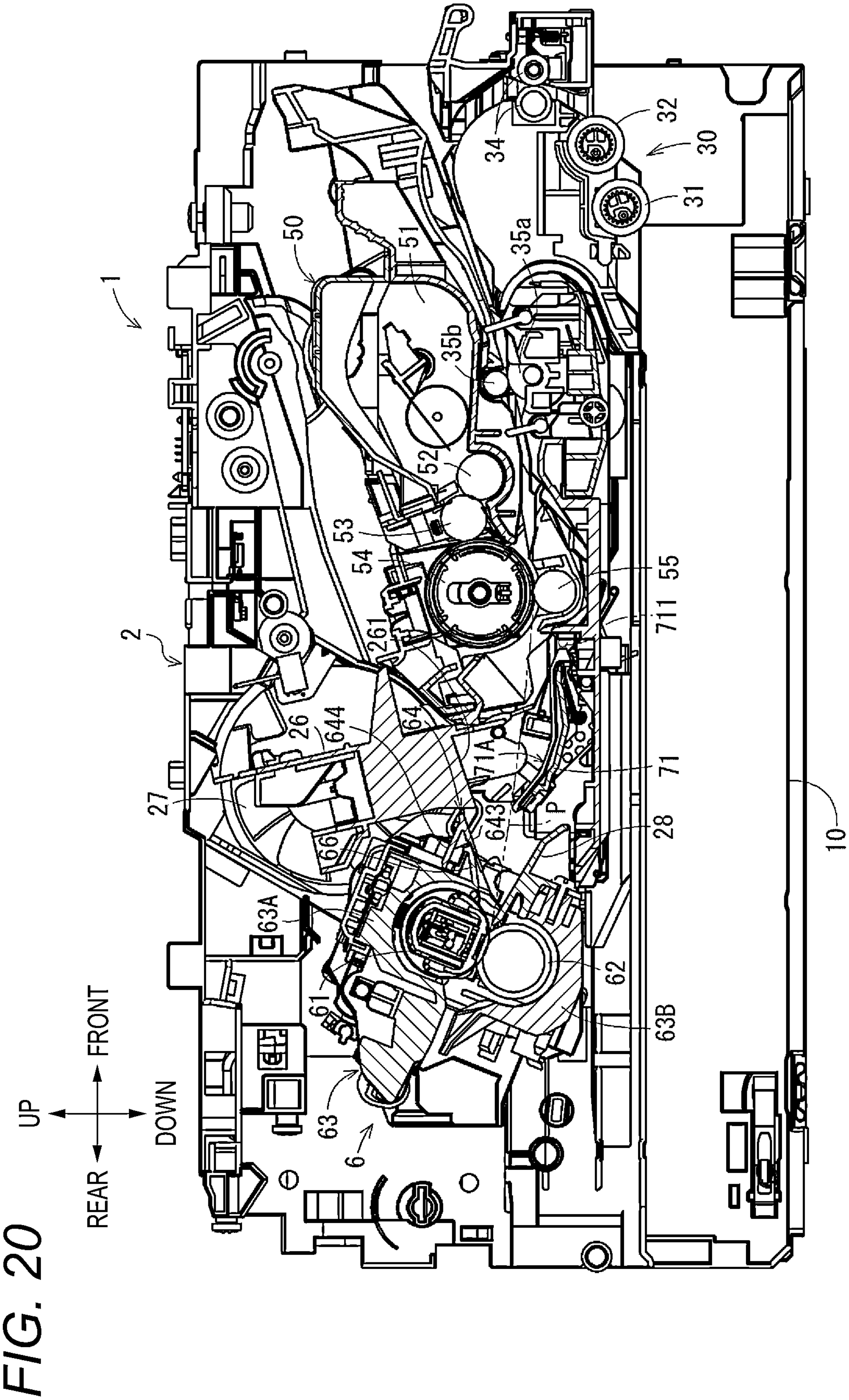
FIG. 20 is a central sectional view showing the image forming apparatus.
Figure 21:
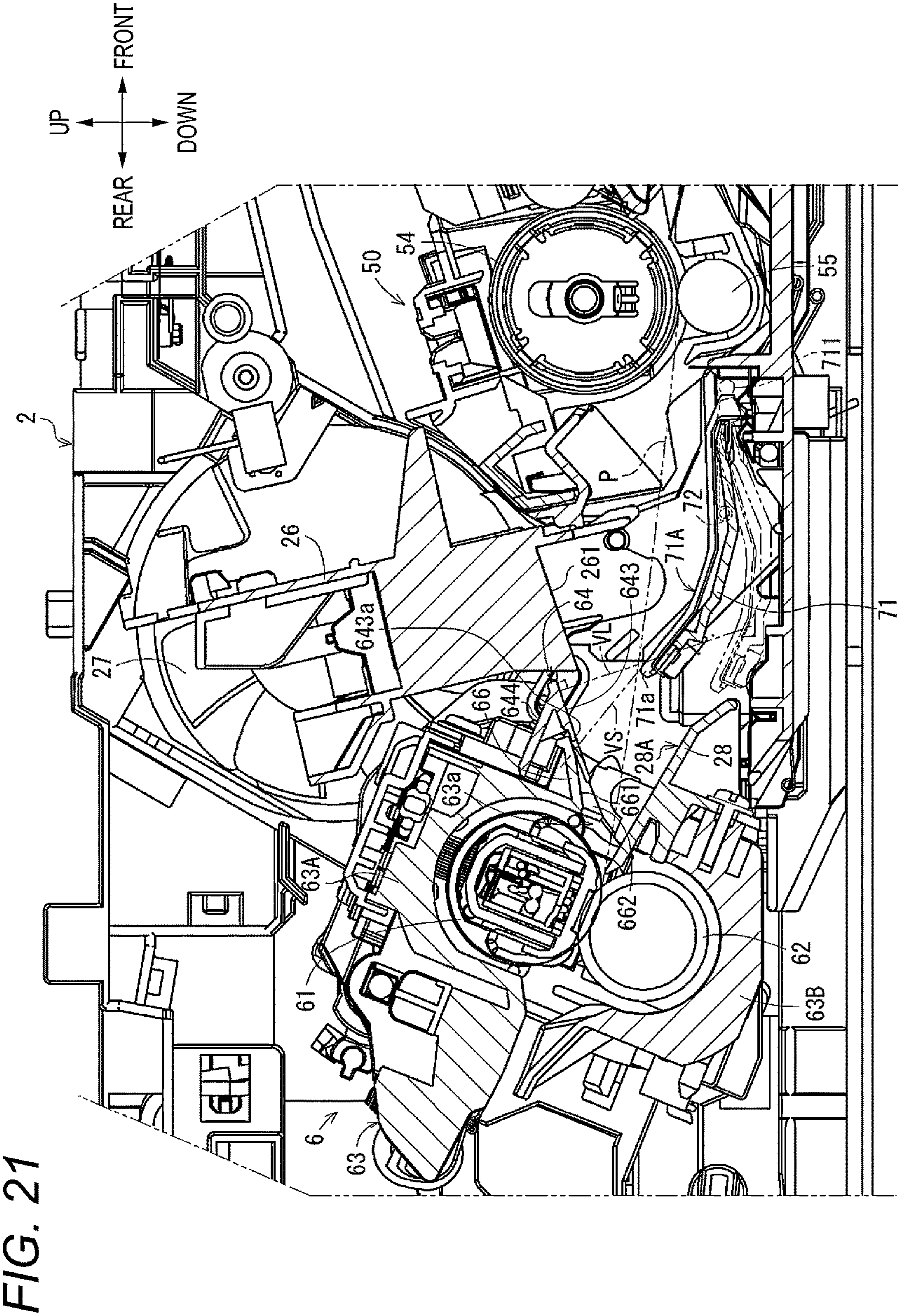
FIG. 21 is a side sectional view showing an area between a photosensitive drum and the fixing device in an apparatus body in a state in which a fixing shutter is at the opened position and the movable chute is at a first position.
Figure 22:
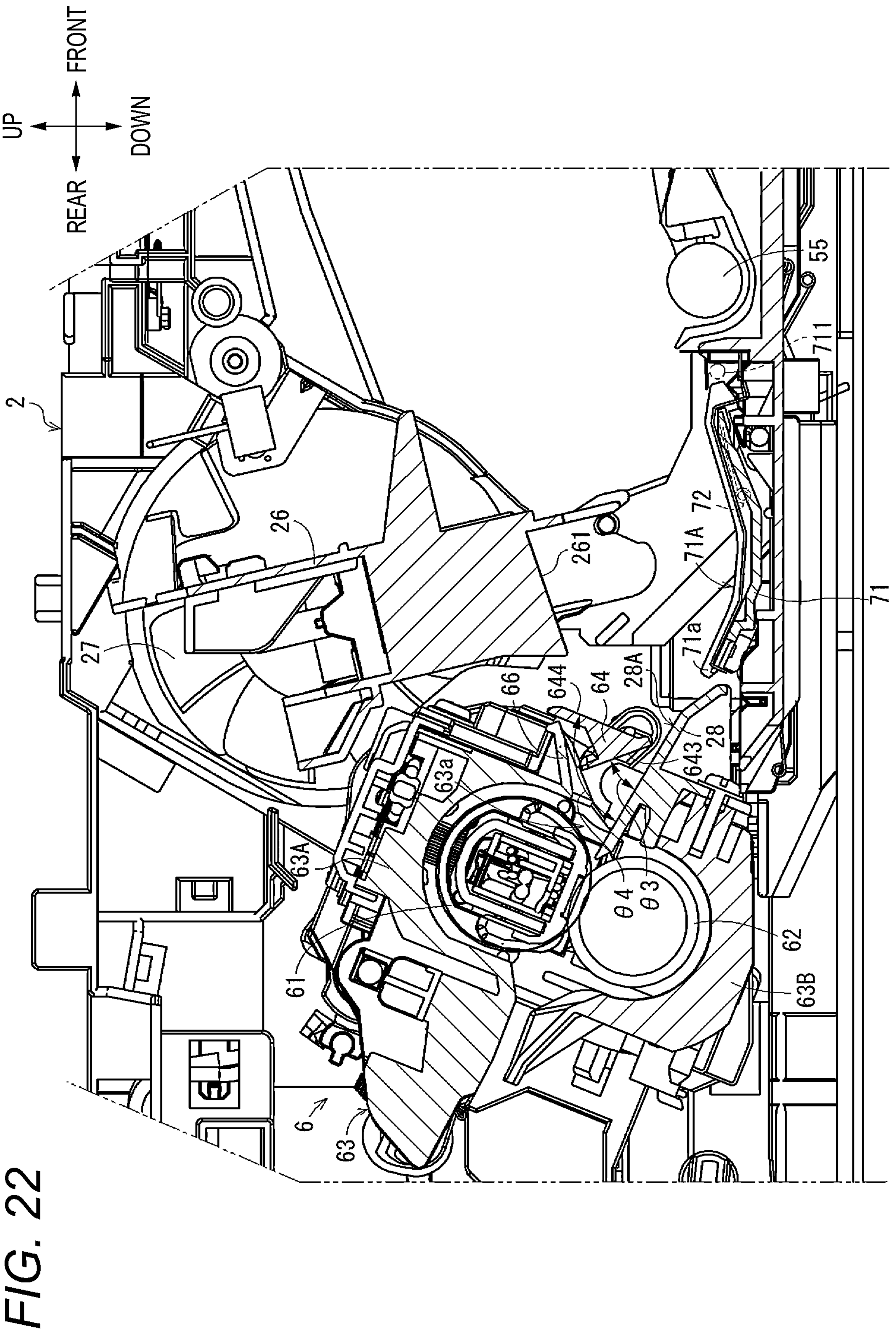
FIG. 22 is a side sectional view showing an area between the photosensitive drum and the fixing device in the apparatus body in a state in which the fixing shutter is at the closed position, and the movable chute is at a second position.

As shown in FIGS. 20 to 22, the apparatus body 2 includes a fixing chute 28 and a fixing guide 66.

The fixing chute 28 is located upstream of the fixing device 6 in the sheet conveying direction, and forms the lower side of the conveying path P of the sheet S. The fixing chute 28 is supported on the lower frame 63B of the fixing frame 63. The fixing chute 28 is located below the conveying path P. The fixing chute 28 has a sheet conveying surface 28A facing upward, and the sheet conveying surface 28A guides the lower side of the sheet S conveyed along the conveying path P.

The fixing guide 66 is located upstream of the heating unit 61 of the fixing device 6 in the sheet conveying direction, and is located to oppose the fixing chute 28 across the conveying path P in a thickness direction of the sheet S conveyed along the conveying path P. The fixing guide 66 is located above the conveying path P, and guides the upper side of the sheet S conveyed along the conveying path P. The fixing guide 66 is supported on the upper frame 63A of the fixing frame 63.

The fixing guide 66 has a guide conveying surface 661 facing downward. The guide conveying surface 661 is an inclined surface that is inclined in a direction approaching the fixing chute 28 toward the downstream in the sheet conveying direction. When the sheet S conveyed from the photosensitive drum 54 toward the downstream in the sheet conveying direction comes into contact with the guide conveying surface 661, the sheet S is guided to the first opening 63*a* of the fixing frame 63 by the guide conveying surface 661.

The fixing shutter 64 is located upstream of the fixing guide 66 in the sheet conveying direction, and is located to oppose the fixing chute 28 across the conveying path P in the thickness direction of the sheet S conveyed along the conveying path P.

The fixing shutter 64 has a shutter conveying surface 643 capable of conveying the sheet S on the upstream side of the fixing guide 66 in the sheet conveying direction in a state in which the fixing shutter 64 is positioned at the opened position. The shutter conveying surface 643 is a surface that faces downward in a state in which the fixing shutter 64 is positioned at the opened position.

The shutter conveying surface 643 is an inclined surface that is inclined in a direction approaching the fixing chute 28 toward the downstream in the sheet conveying direction in a state in which the fixing shutter 64 is positioned at the opened position. When the sheet S conveyed from the photosensitive drum 54 toward the downstream in the sheet conveying direction comes into contact with the shutter conveying surface 643, the sheet S is guided by the shutter conveying surface 643, and then is transferred to the guide conveying surface 661.

Figure 23:
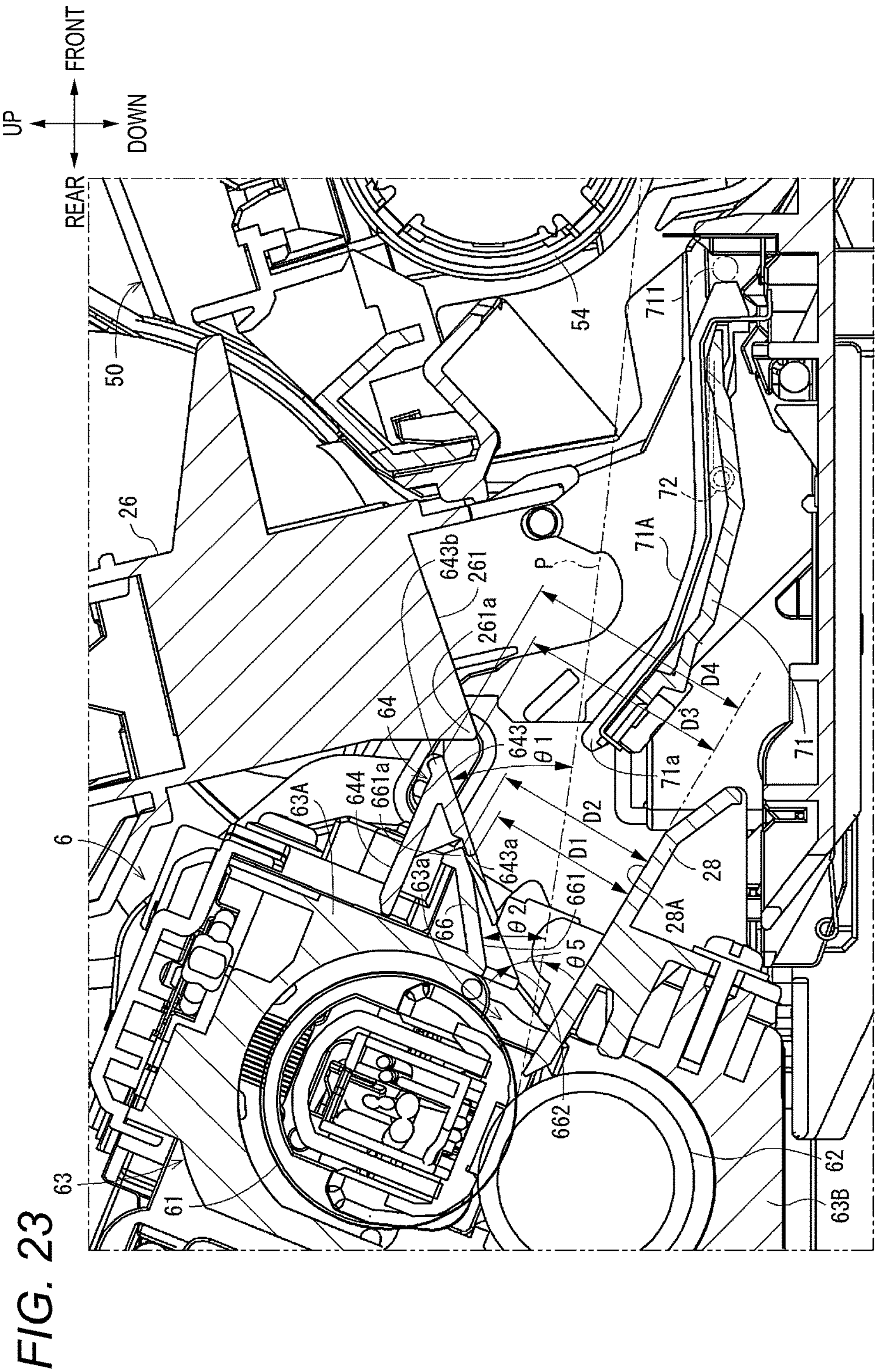
FIG. 23 is a side sectional view showing a positional relationship between a fixing chute, a fixing guide and the fixing shutter.

As shown in FIG. 23, in a state in which the fixing shutter 64 is positioned at the opened position, an end portion 643*a* of the shutter conveying surface 643 on the downstream side in the sheet conveying direction is located closer to the fixing chute 28 than an end portion 661*a* of the guide conveying surface 661 on the upstream side in the sheet conveying direction. In other words, a distance D1 between the end portion 643*a* of the shutter conveying surface 643 on the downstream side in the sheet conveying direction and the sheet conveying surface 28A in the fixing chute 28 is smaller than a distance D2 between the end portion 661*a* of the guide conveying surface 661 on the upstream side in the sheet conveying direction and the sheet conveying surface 28A in the fixing chute 28.

Since the distance D1 is smaller than the distance D2, a step in which the end portion 643*a* is located closer to the fixing chute 28 than the end portion 661*a* is formed between the shutter conveying surface 643 and the guide conveying surface 661. Therefore, when the sheet S conveyed from the photosensitive drum 54 toward the downstream in the sheet conveying direction and guided to the shutter conveying surface 643 is transferred from the shutter conveying surface 643 to the guide conveying surface 661, the leading end of the sheet S that is conveyed is prevented from getting caught in the fixing guide 66, and the sheet S can be conveyed stably even in a case in which the fixing shutter 64 is provided.

Further, in a state in which the fixing shutter 64 is positioned at the opened position, the end portion 643*a* of the shutter conveying surface 643 on the downstream side in the sheet conveying direction overlaps with the guide conveying surface 661 in the sheet conveying direction. In other words, the end portion 643*a* of the shutter conveying surface 643 on the downstream side in the sheet conveying direction is located downstream in the sheet conveying direction of the end portion 661*a* of the guide conveying surface 661 on the upstream side in the sheet conveying direction. As a result, the sheet S guided to the shutter conveying surface 643 can be smoothly transferred to the guide conveying surface 661, making it possible to prevent the sheet S from getting caught in the fixing guide 66.

In addition, an inclination angle θ1 of the shutter conveying surface 643 with respect to the direction along the conveying path P, which is the sheet conveying direction, is formed to be larger than an inclination angle θ2 of the guide conveying surface 661 with respect to the direction along the conveying path P. As a result, a larger space can be secured between the shutter conveying surface 643 and the fixing chute 28, making it possible to prevent the sheet S conveyed from jamming.

As shown in FIG. 22, in a state in which the fixing shutter 64 is positioned at the closed position, the shutter conveying surface 643 faces the fixing device 6 and is located at a position that is hidden from the front side and cannot be seen. When the process cartridge 50 is detached from the apparatus body 2, a user can insert his hand into the apparatus body 2. However, the fixing shutter 64 is positioned at the closed position, and the shutter conveying surface 643 faces the fixing device 6 side, which is difficult for a user's hand to touch. Therefore, it is possible to avoid a situation in which a user's hand touches the shutter conveying surface 643 and dirt adheres to the shutter conveying surface 643, and then, the sheet S conveyed comes into contact with the shutter conveying surface 643, and the sheet S becomes dirty.

[Shielding Surface of Fixing Shutter]

Further, as shown in FIG. 22, the fixing shutter 64 has a shielding surface 644 that covers the upstream side of the heating unit 61 in the sheet conveying direction in a state in which the fixing shutter 64 is positioned at the closed position. The shielding surface 644 extends in a direction intersecting a direction in which the shutter conveying surface 643 extends. For example, an angle θ3 formed between the shutter conveying surface 643 and the sheet conveying surface 28A in the fixing chute 28 is smaller than an angle θ4 formed between the shielding surface 644 and the sheet conveying surface 28A in the fixing chute 28, and the angle θ3 is different from the angle θ4.

As such, since the fixing shutter 64 has the shielding surface 644, and the heating unit 61 is covered by the shielding surface 644 in a state in which the fixing shutter 64 is positioned at the closed position, a user can be restrained from touching the heating unit 61.

[Guide Protrusion of Fixing Guide]

Figure 24:
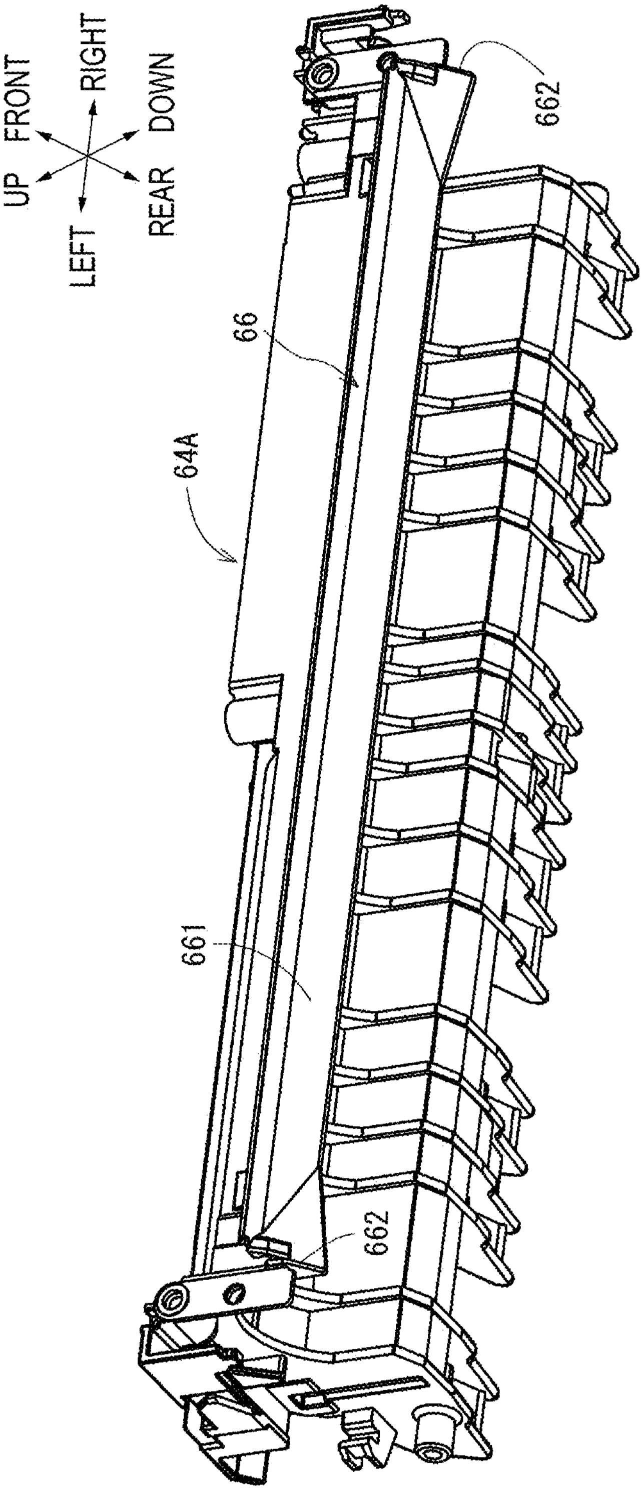
FIG. 24 is a perspective view showing the fixing guide.

In addition, as shown in FIGS. 23 and 24, the fixing guide 66 provided on the upper frame 63A of the fixing frame 63 has guide protrusions 662 located at end portions in the left and right direction of the guide conveying surface 661. The guide protrusions 662 protrude toward the fixing chute 28 side beyond the guide conveying surface 661. The left and right direction is an example of a direction perpendicular to the sheet conveying direction. The guide protrusions 662 can press the left and right end portions of the sheet S conveyed from above.

The guide protrusion 662 is inclined in a direction approaching the fixing chute 28 toward the downstream in the sheet conveying direction, and an inclination angle θ5 of the guide protrusion 662 with respect to the direction along the conveying path P is formed to be larger than the inclination angle θ2 of the guide conveying surface 661 with respect to the direction along the conveying path P.

When the trailing end of the sheet S that is conveyed passes through the guide conveying surface 661, the trailing end of the sheet S may bounce. However, since the fixing guide 66 has the guide protrusions 662, the sheet S conveyed can be pressed by the guide protrusions 662 to suppress the bouncing that occurs at the trailing end of the sheet S.

At this time, since the inclination angle θ5 of the guide protrusions 662 is formed to be larger than the inclination angle θ2 of the guide conveying surface 661, even in a case in which the guide protrusions 662 protrude beyond the guide conveying surface 661, the end portions of the guide protrusions 662 on the upstream side in the sheet conveying direction can be positioned farther away from the fixing chute 28 than the end portion of the guide conveying surface 661 on the downstream side in the sheet conveying direction. As a result, it is possible to prevent the sheet that is conveyed from getting caught in the guide protrusion.

[Upstream Guide]

Figure 25:
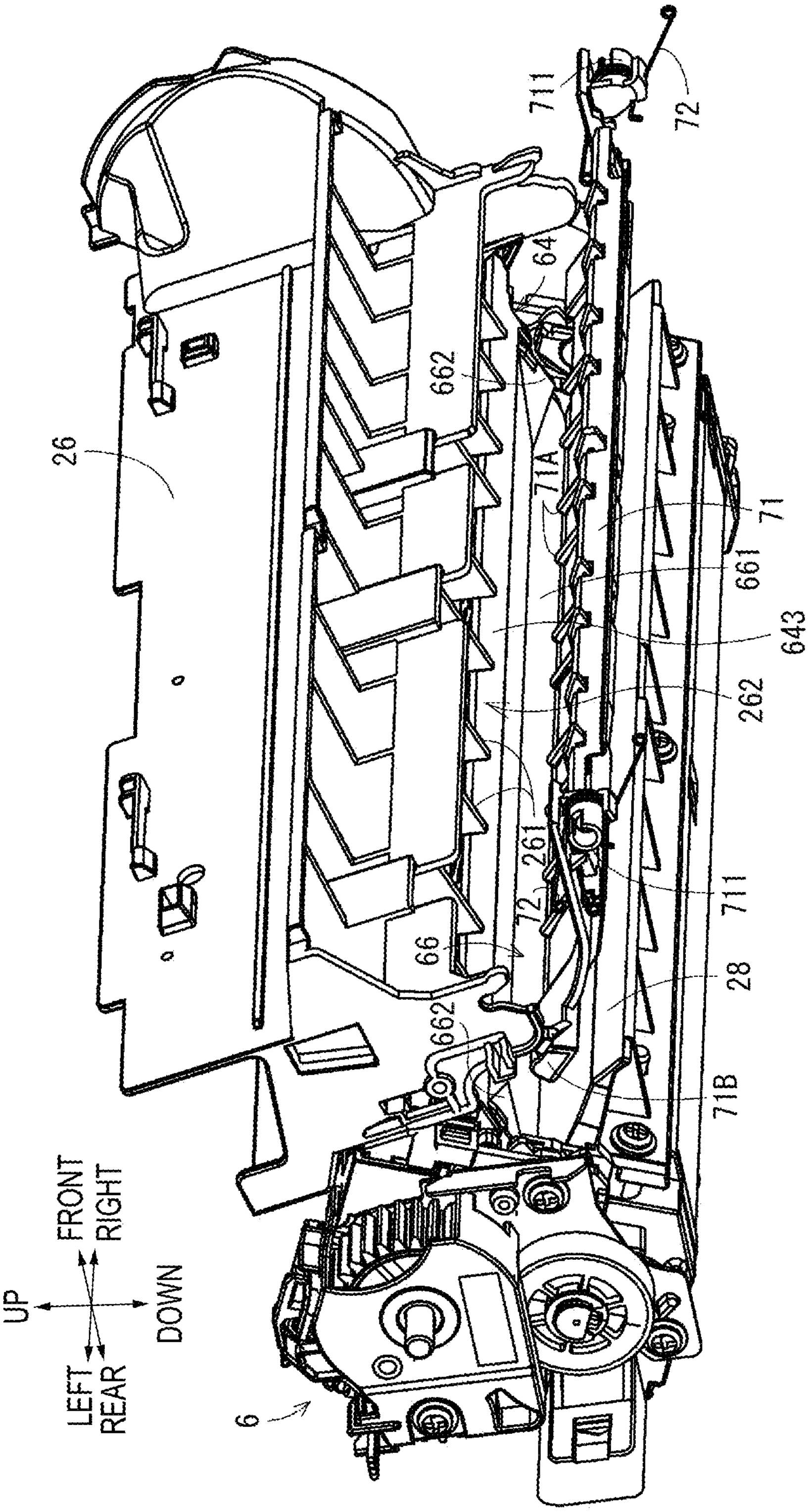
FIG. 25 is a perspective view showing the fixing device, the fixing guide, the fixing shutter, the air duct, and the movable chute.

As shown in FIGS. 21, 22, and 25, the air duct 26 has an upstream guide 261. The upstream guide 261 is located to oppose the fixing chute 28 across the conveying path P in the thickness direction of the sheet S conveyed along the conveying path P.

The upstream guide 261 is formed in a rib shape that extends in the front and rear direction and a plurality of upstream guides 261 are arranged with gaps in the left and right direction. An air vent 262 through which air can flow is formed between the upstream guide 261 and the upstream guide 261 in the left and right direction, and air inside the apparatus body 2 can flow into the air duct 26 through the air vent 262.

The upstream guide 261 can guide the sheet S on the upstream side of the shutter conveying surface 643 of the fixing shutter 64 in the sheet conveying direction. When the sheet S guided by the upstream guide 261 is conveyed to the downstream side of the upstream guide 261 in the sheet conveying direction, the sheet S is transferred from the upstream guide 261 to the shutter conveying surface 643.

A lower end of the upstream guide 261 is inclined in a direction approaching the fixing chute 28 toward the downstream in the sheet conveying direction. An end portion 261*a* of the upstream guide 261 on the downstream side in the sheet conveying direction is located closer to the fixing chute 28 than an end portion 643*b* of the shutter conveying surface 643 on the upstream side in the sheet conveying direction. In other words, a distance D3 between the end portion 261*a* of the upstream guide 261 on the downstream side in the sheet conveying direction and the sheet conveying surface 28A in the fixing chute 28 is smaller than a distance D4 between the end portion 643*b* of the shutter conveying surface 643 on the upstream side in the sheet conveying direction and the sheet conveying surface 28A in the fixing chute 28.

Meanwhile, in the description, "the fixing chute" in the term "approaching the fixing chute 28" and "closer to the fixing chute 28" may include a virtual plane extending from the sheet conveying surface 28A in the fixing chute.

As such, since the distance D3 is smaller than the distance D4, a step in which the end portion 261*a* is located closer to the fixing chute 28 than the end portion 643*b* is formed between the upstream guide 261 and the shutter conveying surface 643. Therefore, when the sheet S guided by the upstream guide 261 is transferred to the shutter conveying surface 643, the sheet S is prevented from getting caught in the fixing shutter 64, and the sheet S can be stably conveyed.

[Movable Chute]

As shown in FIGS. 21 to 23, and 25, the image forming apparatus 1 includes a movable chute 71. The movable chute 71 is located between the process cartridge 50 and the fixing device 6 in the front and rear direction. In other words, the movable chute 71 is located downstream of the photosensitive drum 54 and the transfer roller 55 that constitute the transfer unit, and upstream of the fixing device 6 in the sheet conveying direction.

The movable chute 71 is located to oppose the upstream guide 261 across the conveying path P in the thickness direction of the sheet S conveyed along the conveying path P, and can guide the sheet S conveyed from below.

The movable chute 71 can rotate about a rotation shaft 711 located at the front end portion. By rotating about the rotation shaft 711, the movable chute 71 is movable between a first position (position indicated by a solid line in FIG. 21) and a second position (position indicated in FIG. 22 and the position indicated by a dotted line in FIG. 21) in which an end portion 71*a* on the downstream side in the sheet conveying direction is farther from the conveying path P than the first position.

The movable chute 71 has a sheet conveying surface 71A that guides the sheet S. The sheet conveying surface 71A faces upward. When the movable chute 71 is positioned at the first position, the sheet conveying surface 71A guides the sheet S conveyed from the process cartridge 50 toward the fixing device 6. In addition, when the movable chute 71 is positioned at the second portion, the sheet conveying surface 71A is located farther from the conveying path P than when the movable chute 71 is positioned at the first position. In a case in which the sheet S is conveyed by the transfer unit and the fixing device 6, the conveying speed of the sheet S by the transfer unit is faster than the conveying speed of the sheet S by the fixing device 6, and bending occurs in the sheet S between the fixing device 6 and the transfer unit. The transfer unit includes the photosensitive drum 54 and the transfer roller 55. When the movable chute 71 is positioned at the second position, the sheet conveying surface 71A guides the sheet S, which is bent toward the sheet conveying surface 71A between the fixing device 6 and the transfer unit.

As such, since the sheet S is guided by the movable chute 71 at the first position closer to the conveying path P than the second position, the sheet that is conveyed from the transfer unit, which includes the photosensitive drum 54 and the transfer roller 55, can be properly guided to the fixing device 6 by the movable chute 71.

As shown in FIG. 21, in a state in which the movable chute 71 is positioned at the first position, the movable chute 71 is configured such that a virtual plane VS obtained by extending the sheet conveying surface 71A at the end portion 71*a* of the movable chute 71 on the downstream side in the sheet conveying direction passes through the fixing guide 66.

The leading end of the sheet S guided to the sheet conveying surface 71A of the movable chute 71 may move downstream of the shutter conveying surface 643 without coming into contact with the shutter conveying surface 643. This situation is likely to occur in a case in which the sheet S is a curled paper that curls away from the shutter conveying surface 643 or in a case in which the sheet S is a straight paper that is not particularly curled.

In such a case, since the virtual plane VS of the sheet conveying surface 71A is configured to pass through the fixing guide 66, the leading end of the sheet S guided by the movable chute 71 comes into contact with the guide conveying surface 661 located downstream of the shutter conveying surface 643, making it possible to guide the sheet S to the fixing device 6 more stably.

In addition, as shown in FIG. 21, a perpendicular line VL to the shutter conveying surface 643 in the fixing shutter 64 is configured to pass through the sheet conveying surface 71A of the movable chute 71. In the present embodiment, the perpendicular line VL of the shutter conveying surface 643 is configured to pass through both the sheet conveying surface 71A of the movable chute 71 positioned at the first position and the sheet conveying surface 71A of the movable chute 71 positioned at the second position.

As a result, a contact angle of the sheet S guided by the movable chute 71 with respect to the shutter conveying surface 643 can be prevented from exceeding 90 degrees, and thus, the sheet S can be suppressed from being guided to the upstream side in the sheet conveying direction by the shutter conveying surface 643. Therefore, the sheet S conveyed from the movable chute 71 can be appropriately guided toward the fixing device 6 by the shutter conveying surface 643.

[Operation of Movable Chute]

As shown in FIG. 23, the image forming apparatus 1 includes a chute spring 72 that urges the movable chute 71. The chute spring 72 urges the movable chute 71 toward the first position.

Figure 26:
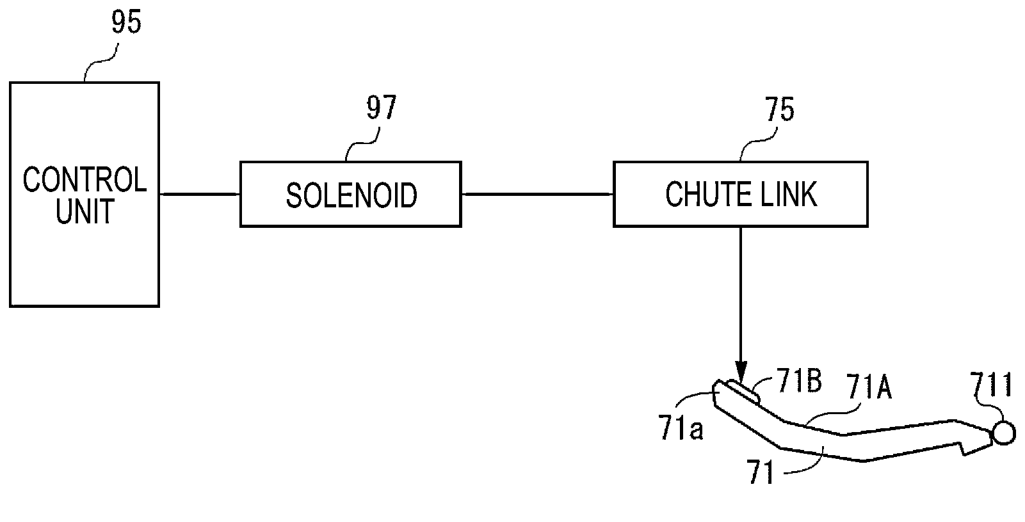
FIG. 26 is a block diagram showing a drive mechanism for the movable chute.

Further, as shown in FIG. 26, the image forming apparatus 1 includes a solenoid 97 that is a drive source for moving the movable chute 71. The solenoid 97 is a solenoid actuator for moving the movable chute 71 from the first position to the second position. The solenoid 97 is connected to the control unit 95, and the control unit 95 controls the operation of the solenoid 97.

After the leading end of the sheet S that is conveyed passes through the fixing device 6, the control unit 95 controls the solenoid 97 to move movable chute 71 from the first position to the second position. The solenoid 97 is configured to move the movable chute 71 via a chute link 75, for example.

At this time, the control unit 95 can determine that the leading end of the sheet S has passed through the fixing device 6, for example, when a predetermined time has elapsed after the post-registration sensor 98 detects the leading end of the sheet S, and can control the solenoid 97 to move the movable chute 71 from the first position to the second position.

In addition, the control unit 95 can determine that the trailing end of the sheet S has passed through the fixing device 6, for example, when a predetermined time has elapsed after the post-registration sensor 98 detects the trailing end of the sheet S, and can control the solenoid 97 to move the movable chute 71 from the first position to the second position.

[Chute Link]

Figure 27:
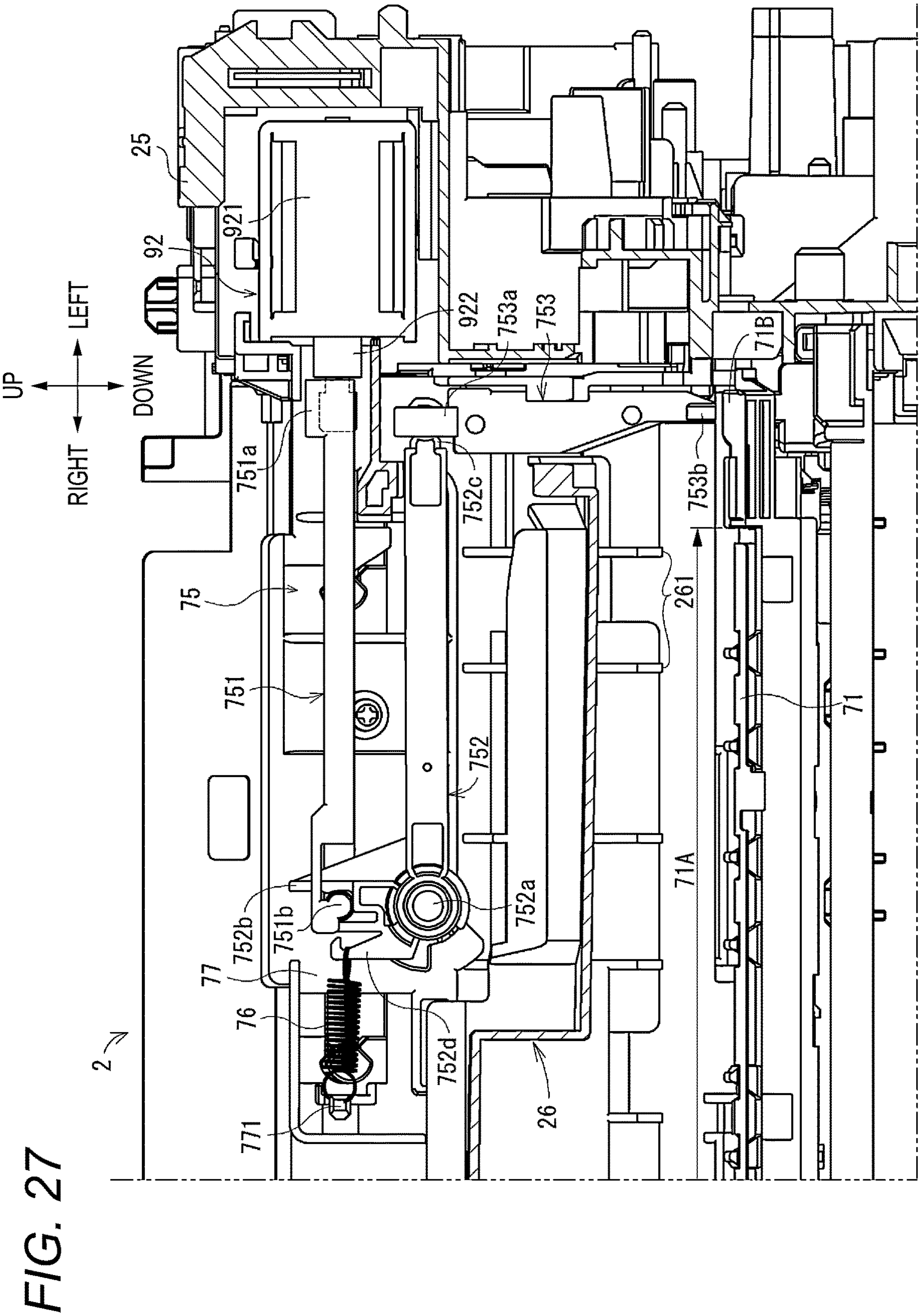
FIG. 27 is a rear sectional view showing a chute link in a state of being separated from the movable chute.
Figure 28:
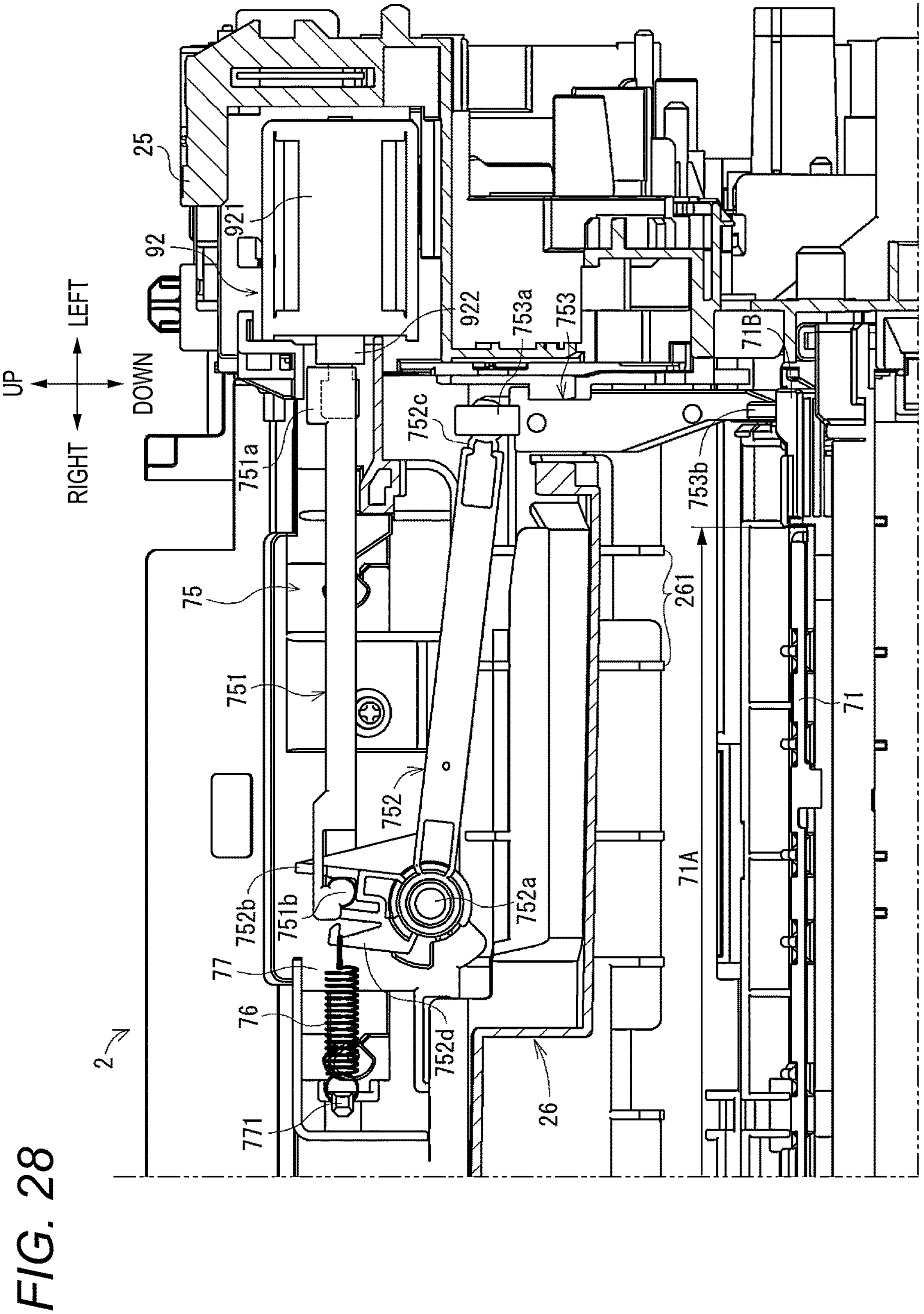
FIG. 28 is a rear sectional view showing the chute link in a state of pressing the movable chute.

As shown in FIGS. 26 to 28, the chute link 75 is connected to the solenoid 97 and is driven by the solenoid 97 to press the movable chute 71, thereby moving the movable chute 71 from the first position to the second position.

The solenoid 97 has a body portion 921 supported on the second body frame 25, and a plunger 922 that is movable in the left and right direction with respect to the body portion 921. The plunger 922 is urged rightward from the body portion 921 by an urging member. In a state in which the solenoid 97 is not driven by the control unit 95, the plunger 922 moves rightward and in a state of advancing from the body portion 921. On the other hand, in a state in which the solenoid 97 is driven by the control unit 95, the plunger 922 is retracted into the body portion 921 and in a state of moving to the left side.

The chute link 75 has a first link 751, a second link 752, and a third link 753. The first link 751 and the second link 752 are located inside the air duct 26, and the third link 753 protrudes downward from the inside of the air duct 26. A holder 77 for supporting the chute link 75 is attached to the inside of the air duct 26.

The first link 751 is a long member extending in the left and right direction, and is supported on the holder 77 so as to be movable in the left and right direction. The first link 751 has a first end portion 751*a* that is a left end portion, and a second end portion 751*b* that is a right end portion. The first end portion 751*a* is connected to the plunger 922 of the solenoid 97. The second end portion 751*b* is in contact with the second link 752.

The second link 752 is a long member extending in the left and right direction, and is located below the first link 751. The second link 752 has a rotation shaft portion 752*a* located at a right end portion, a contact portion 752*b* extending upward from the rotation shaft portion 752*a*, a tip portion 752*c* that is a left end portion, and an engagement portion 752*d* extending obliquely upward and rightward from the rotation shaft portion 752*a*. The second link 752 is supported on the holder 77 so as to be rotatable about the rotation shaft portion 752*a*.

The image forming apparatus 1 includes a link spring 76 that urges the second link 752. The link spring 76 is attached to the holder 77. One end of the link spring 76 engages with a hook 771 of the holder 77, and the other end of the link spring 76 engages with the engagement portion 752*d* of the second link 752. The second link 752 is urged by the link spring 76 so as to rotate in a direction in which the tip portion 752*c* moves upward. The contact portion 752*b* is in contact with the second end portion 751*b* of the first link 751. When the first link 751 moves leftward, the contact portion 752*b* is pressed leftward by the second end portion 751*b*, and the second link 752 rotates in a direction in which the tip portion 752*c* moves downward.

The third link 753 is a long member extending in the upper and lower direction, and is arranged to be movable in the upper and lower direction. The third link 753 has a connecting portion 753*a* located at an upper end, and a pressing portion 753*b* located at a lower end. The connecting portion 753*a* is connected to the tip portion 752*c* of the second link 752, and the pressing portion 753*b* can press a pressable portion 71B of the movable chute 71.

The pressable portion 71B of the movable chute 71 is formed on the sheet conveying surface 71A side, and faces upward. In the left and right direction, the sheet conveying surface 71A of the movable chute 71 is formed in an area where the sheet S passes, and the pressable portion 71B is located outside an area where the sheet conveying surface 71A is formed. In the present embodiment, the pressable portion 71B is formed on the left side of the area where the sheet conveying surface 71A is formed.

The pressing portion 753*b* of the third link 753 and the pressable portion 71B of the movable chute 71 face each other in the upper and lower direction. As the third link 753 moves downward, the pressing portion 753*b* presses the pressable portion 71B.

In the chute link 75 thus configured, in an off state in which the solenoid 97 is not driven by the control unit 95, the first link 751 connected to the plunger 922 is in a state of being moved to the right side, and the second link 752 is rotated by an urging force of the link spring 76 in a direction in which the tip portion 752*c* moves upward.

The third link 753 is in a state of being moved upward by the second link 752, and the pressing portion 753*b* of the third link 753 is spaced apart from the pressable portion 71B of the movable chute 71. The movable chute 71 is moved to the first position by an urging force of the chute spring 72.

On the other hand, in an on state in which the solenoid 97 is driven by the control unit 95, the first link 751 moves leftward by the plunger 922 attracted by the body portion 921. When the first link 751 moves leftward, the contact portion 752*b* of the second link 752 is pressed by the second end portion 751*b* of the first link 751, and the second link 752 rotates against an urging force of the link spring 76 in a direction in which the tip portion 752*c* moves downward.

As the second link 752 rotates, the third link 753 moves downward, and the pressing portion 753*b* of the third link 753 presses the pressable portion 71B of the movable chute 71 downward, causing the movable chute 71 to move from the first position to the second position against an urging force of the chute spring 72.

As described above, the chute link 75 is configured to be driven by the solenoid 97 to press the movable chute 71 from the sheet conveying surface 71A side, thereby moving the movable chute 71 from the first position to the second position. As a result, the movable chute 71 can be quickly and stably moved from the first position to the second position.

In addition, with this configuration, the control unit 95 can turn on the solenoid 97 after the leading end of the sheet S conveyed passes through the fixing device 6, and can move the movable chute 71 from the first position to the second position by pressing the movable chute 71 from the sheet conveying surface 71A side by the chute link 75.

Furthermore, after the trailing end of the sheet S conveyed passes through the transfer unit including the photosensitive drum 54 and the transfer roller 55, the control unit 95 can turn off the solenoid 97 to separate the chute link 75 from the movable chute 71, and can move the movable chute 71 from the second position to the first position by an urging force of the chute spring 72.

In the image forming apparatus 1, after the leading end of the sheet S passes through the fixing device 6, there is a period during which the sheet S is conveyed by both the fixing device 6 and, the transfer unit including the photosensitive drum 54 and the transfer roller 55.

During this period, the conveying speed of the sheet S by the photosensitive drum 54 and the transfer roller 55 that constitute the transfer unit is faster than the conveying speed of the sheet S by the fixing device 6, and thus, bending occurs in the sheet S between the fixing device 6 and the transfer unit. Therefore, by moving the movable chute 71 toward the second position away from the conveying path P under the control of the control unit 95, a larger space can be secured between the fixing device 6 and the transfer unit, making it possible to prevent the bent sheet S from interfering with other components of the apparatus body 2.

Further, after the trailing end of the sheet S passes through the transfer unit including the photosensitive drum 54 and the transfer roller 55, there is no longer any sheet S being conveyed by both the fixing device 6 and the transfer unit. Therefore, by turning off the solenoid 97 under the control of the control unit 95 and moving the movable chute 71 to the first position, power saving in the image forming apparatus 1 can be achieved. In addition, the next sheet S conveyed from the transfer unit can be appropriately guided by the movable chute 71 located at the first position.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus comprising:

an apparatus body;

a fixing device comprising a heating unit, the fixing device being configured to fix a toner image onto a sheet that is conveyed on a sheet conveying path in a sheet conveying direction;

a fixing chute located upstream of the fixing device in the sheet conveying direction, the fixing chute being configured to form a part of the sheet conveying path;

a fixing guide located upstream of the heating unit in the sheet conveying direction to oppose the fixing chute across the sheet conveying path in a sheet thickness direction, the fixing guide being configured to guide the sheet and comprising a guide conveying surface inclined in a direction approaching the fixing chute toward a downstream side in the sheet conveying direction; and a fixing shutter located to oppose the fixing chute across the sheet conveying path in the sheet thickness direction and configured to move between a closed position and an opened position, the closed position at which the fixing shutter covers a part of the heating unit on an upstream side relative to the fixing device in the sheet conveying direction, the opened position at which the fixing shutter opens the part of the heating unit on the upstream side relative to the fixing device in the sheet conveying direction, wherein the fixing shutter comprises a shutter conveying surface, and wherein in a state in which the fixing shutter is positioned at the opened position:

the shutter conveying surface is configured to guide the sheet on the upstream side of the fixing guide in the sheet conveying direction; and the shutter conveying surface is inclined in a direction approaching the fixing chute toward the downstream side in the sheet conveying direction such that an end portion of the shutter conveying surface on the downstream side in the sheet conveying direction is located closer to the fixing chute than an end portion of the guide conveying surface on the upstream side in the sheet conveying direction.

2. The image forming apparatus according to claim 1, wherein in the state in which the fixing shutter is positioned at the opened position, the end portion of the shutter conveying surface on the downstream side in the sheet conveying direction overlaps with the guide conveying surface in the sheet conveying direction.

3. The image forming apparatus according to claim 1, wherein an inclination angle of the shutter conveying surface with respect to the sheet conveying direction is larger than an inclination angle of the guide conveying surface with respect to the sheet conveying direction.

4. The image forming apparatus according to claim 1, wherein in a state in which the fixing shutter is positioned at the closed position, the shutter conveying surface of the fixing shutter faces the fixing device.

5. The image forming apparatus according to claim 1, wherein the fixing shutter comprises a shielding surface, and wherein in a state in which the fixing shutter is positioned at the closed position:

the shielding surface covers the part of the heating unit on the upstream side relative to the fixing device in the sheet conveying direction; and the shielding surface extends in a direction intersecting a direction in which the shutter conveying surface extends.

6. The image forming apparatus according to claim 5, comprising:

a cartridge configured to be attached to and detached from the apparatus body; and a shutter link provided in the apparatus body and connected to the fixing shutter, the shutter link being configured to move the fixing shutter between the opened position and the closed position in conjunction with an operation of attaching and detaching the cartridge with respect to the apparatus body.

7. The image forming apparatus according to claim 6, comprising:

an upstream guide configured to guide the sheet on the upstream side of the shutter conveying surface of the fixing shutter in the sheet conveying direction, wherein an end portion of the upstream guide on the downstream side in the sheet conveying direction is located closer to the fixing chute than an end portion of the shutter conveying surface on the upstream side in the sheet conveying direction.

8. The image forming apparatus according to claim 1, comprising:

a movable chute that is located downstream of a transfer unit configured to transfer an image onto the sheet and upstream of the fixing device in the sheet conveying direction, the movable chute being configured to move between a first position and a second position, wherein an end portion of the movable chute on the downstream side in the sheet conveying direction in a state in which the movable chute is positioned at the second position is farther from the sheet conveying path than an end portion of the movable chute on the downstream side in the sheet conveying direction in a state in which the movable chute is positioned at the first position.

9. The image forming apparatus according to claim 8, wherein the movable chute comprises a sheet conveying surface configured to guide the sheet, and wherein in a state in which the movable chute is positioned at the first position, a virtual plane passes through the fixing guide, the virtual plane being obtained by extending the sheet conveying surface at an end portion of the movable chute on the downstream side in the sheet conveying direction.

10. The image forming apparatus according to claim 8, wherein a perpendicular line to the shutter conveying surface of the fixing shutter passes through the movable chute.

11. The image forming apparatus according to claim 8, comprising:

a drive source configured to move the movable chute; and a controller configured to control an operation of the drive source, wherein the controller is configured to control the drive source to move the movable chute from the first position toward the second position after a leading end of the sheet passes through the fixing device.

12. The image forming apparatus according to claim 11, comprising:

a chute link connected to the drive source and configured to move the movable chute from the first position to the second position, wherein the drive source is a solenoid actuator configured to drive the chute link, wherein the movable chute comprises a sheet conveying surface configured to guide the sheet, and wherein the chute link is driven by the drive source to press the movable chute from a sheet conveying surface side to move the movable chute from the first position to the second position.

13. The image forming apparatus according to claim 1, wherein the fixing guide comprises a guide protrusion located at an end portion of the guide conveying surface in a direction perpendicular to the sheet conveying direction and protruding toward the fixing chute beyond the guide conveying surface, wherein the guide protrusion is inclined in a direction approaching the fixing chute toward the downstream side in the sheet conveying direction, and wherein an inclination angle of the guide protrusion with respect to the sheet conveying direction is larger than an inclination angle of the shutter conveying surface with respect to the sheet conveying direction.

14. An image forming apparatus comprising:

an apparatus body;

a fixing device comprising a heating unit, the fixing device being configured to fix a toner image onto a sheet that is conveyed on a sheet conveying path in a sheet conveying direction;

a fixing chute located upstream of the fixing device in the sheet conveying direction, the fixing chute being configured to form a part of the sheet conveying path;

a fixing guide located upstream of the heating unit in the sheet conveying direction to oppose the fixing chute across the sheet conveying path in a sheet thickness direction, the fixing guide being configured to guide the sheet and comprising a guide conveying surface inclined in a direction approaching the fixing chute toward a downstream side in the sheet conveying direction;

a fixing shutter located to oppose the fixing chute across the sheet conveying path in the sheet thickness direction and configured to move between a closed position and an opened position, the closed position at which the fixing shutter covers a part of the heating unit on an upstream side relative to the fixing device in the sheet conveying direction, the opened position at which the fixing shutter opens the part of the heating unit on the upstream side relative to the fixing device in the sheet conveying direction; and a movable chute that is located downstream of a transfer unit configured to transfer an image onto the sheet and upstream of the fixing device in the sheet conveying direction, the movable chute being configured to move between a first position and a second position, wherein an end portion of the movable chute on the downstream side in the sheet conveying direction in a state in which the movable chute is positioned at the second position is farther from the sheet conveying path than an end portion of the movable chute on the downstream side in the sheet conveying direction in a state in which the movable chute is positioned at the first position.

15. The image forming apparatus according to claim 14, wherein the movable chute comprises a sheet conveying surface configured to guide the sheet, and wherein in a state in which the movable chute is positioned at the first position, a virtual plane passes through the fixing guide, the virtual plane being obtained by extending the sheet conveying surface at an end portion of the movable chute on the downstream side in the sheet conveying direction.

16. The image forming apparatus according to claim 14, comprising:

a drive source configured to move the movable chute; and a controller configured to control an operation of the drive source, wherein the controller is configured to control the drive source to move the movable chute from the first position toward the second position after a leading end of the sheet passes through the fixing device.

17. The image forming apparatus according to claim 16, comprising:

a chute link connected to the drive source and configured to move the movable chute from the first position to the second position, wherein the drive source is a solenoid actuator configured to drive the chute link, wherein the movable chute comprises a sheet conveying surface configured to guide the sheet, and wherein the chute link is driven by the drive source to press the movable chute from a sheet conveying surface side to move the movable chute from the first position to the second position.

* * * * *